United States Patent
Sasai et al.

(10) Patent No.: US 9,369,705 B2
(45) Date of Patent: Jun. 14, 2016

(54) MOVING PICTURE CODING METHOD AND MOVING PICTURE DECODING METHOD

(75) Inventors: Hisao Sasai, Osaka (JP); Takahiro Nishi, Nara (JP); Youji Shibahara, Osaka (JP); Toshiyasu Sugio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 364 days.

(21) Appl. No.: 13/979,918

(22) PCT Filed: Jan. 18, 2012

(86) PCT No.: PCT/JP2012/000286
§ 371 (c)(1),
(2), (4) Date: Jul. 16, 2013

(87) PCT Pub. No.: WO2012/098878
PCT Pub. Date: Jul. 26, 2012

(65) Prior Publication Data
US 2013/0301719 A1  Nov. 14, 2013

Related U.S. Application Data

(60) Provisional application No. 61/434,062, filed on Jan. 19, 2011.

(51) Int. Cl.
*H04N 7/12* (2006.01)
*H04N 19/50* (2014.01)
(Continued)

(52) U.S. Cl.
CPC ....... *H04N 19/00569* (2013.01); *H04N 19/105* (2014.11); *H04N 19/11* (2014.11); *H04N 19/159* (2014.11); *H04N 19/176* (2014.11); *H04N 19/107* (2014.11); *H04N 19/61* (2014.11)

(58) Field of Classification Search
CPC .......... H04N 19/00569; H04N 19/105; H04N 19/159; H04N 19/176; H04N 19/11; H04N 19/61; H04N 19/107
USPC ........................................ 375/240.12, 240.24
See application file for complete search history.

(56) References Cited

U.S. PATENT DOCUMENTS 8,204,120 B2  6/2012  Lim et al.
8,599,918 B2  12/2013  Yoshida et al.
(Continued)

FOREIGN PATENT DOCUMENTS

JP      3-295363     12/1991
JP    2008-166916    7/2008
(Continued)

OTHER PUBLICATIONS

International Search Report issued Apr. 3, 2012 in corresponding International Application No. PCT/JP2012/000286.
(Continued)

*Primary Examiner* — Allen Wong
(74) *Attorney, Agent, or Firm* — Wenderoth, Lind & Ponack, L.L.P.

(57) ABSTRACT

A moving picture coding method includes: judging whether or not is to be performed on a coding target block; (b) judging, when the result of the judgment in step (a) is TRUE, whether or not the coding target block is a block that does not refer to at least part of intra predictors; (c) determining an intra predictor based on image information of the coding target block, when the result of the judgment in step (b) is TRUE; and (d) deriving a predictive image signal for the coding target block, using the intra predictor.

17 Claims, 35 Drawing Sheets

(51) Int. Cl.
*H04N 19/105* (2014.01)
*H04N 19/159* (2014.01)
*H04N 19/176* (2014.01)
*H04N 19/11* (2014.01)
*H04N 19/61* (2014.01)
*H04N 19/107* (2014.01)

(56) References Cited

U.S. PATENT DOCUMENTS

| | | |
|---|---|---|
| 9,008,173 B2 | 4/2015 | Matsuo et al. |
| 2006/0222080 A1* | 10/2006 | Wang .............. H04N 19/61 375/240.24 |
| 2009/0201991 A1 | 8/2009 | Lim et al. |
| 2010/0135389 A1* | 6/2010 | Tanizawa ............ H04N 19/159 375/240.12 |
| 2010/0177821 A1 | 7/2010 | Kadoto et al. |
| 2010/0195724 A1 | 8/2010 | Yoshida et al. |
| 2010/0208803 A1 | 8/2010 | Matsuo et al. |
| 2010/0220790 A1 | 9/2010 | Jeon et al. |

FOREIGN PATENT DOCUMENTS

| | | |
|---|---|---|
| JP | 2009-194914 | 8/2009 |
| JP | 2010-166133 | 7/2010 |
| WO | 2009/050766 | 4/2009 |
| WO | 2009/051091 | 4/2009 |
| WO | 2009/051419 | 4/2009 |

OTHER PUBLICATIONS

Thomas Wiegand, "Text of Final Committee Draft of Joint Video Specification (ITU-T Rec. H.264 | ISO/IEC 14496-10 AVC)", ISO/IEC JTC1/SC29/WG11, MPEG02/N4920, Jul. 2002, Klagenfurt, AT.

Thomas Davies et al., "Suggestion for a Test Model", Joint Collaborative Team on Video Coding (JCT-VC) of ITU-T SG16 WP3 and ISO/IEC JTC1/SC29/WG11, JCTVC-A033_r1, 1st Meeting: Dresden, DE, May 2010, pp. 1-15.

Byeongmoon Jeon et al., "Description of video coding technology proposal by LG Electronics", Joint Collaborative Team on Video Coding (JCT-VC) of ITU-T SG16 WP3 and ISO/IEC JTC1/SC29/WG11, JCTVC-A110, 1st Meeting: Dresden, DE, Apr. 2010, pp. 1 and 4-11.

* cited by examiner

FIG. 5
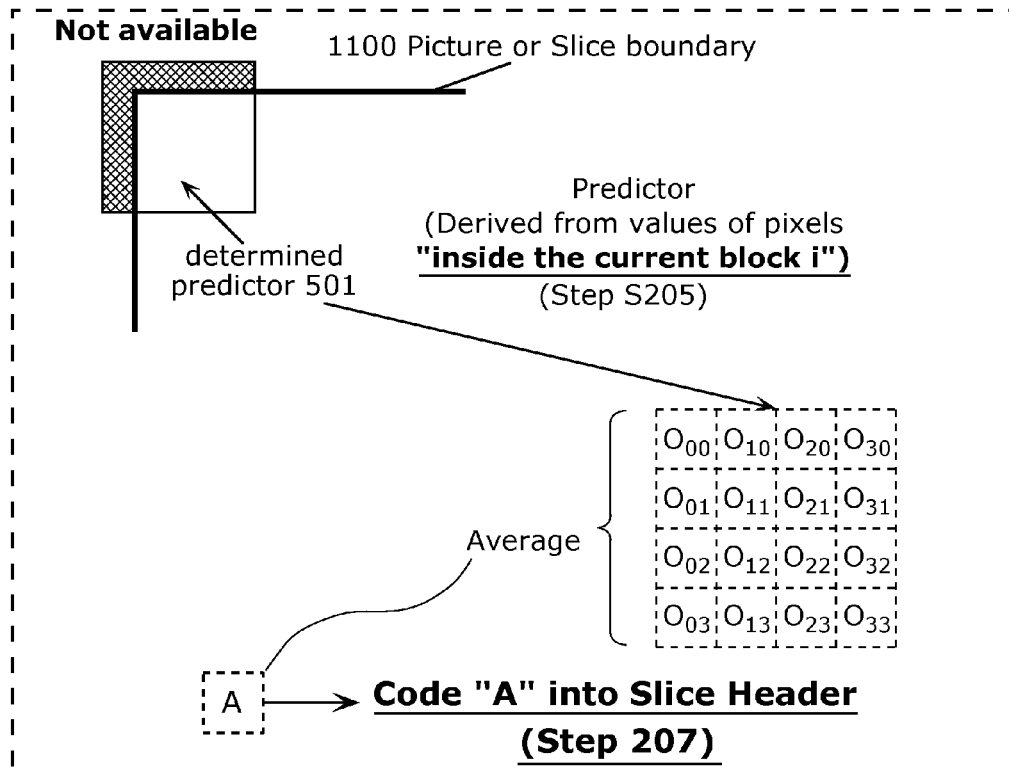
(a) Predictor to be determined and predictor to be coded (S207, S207)
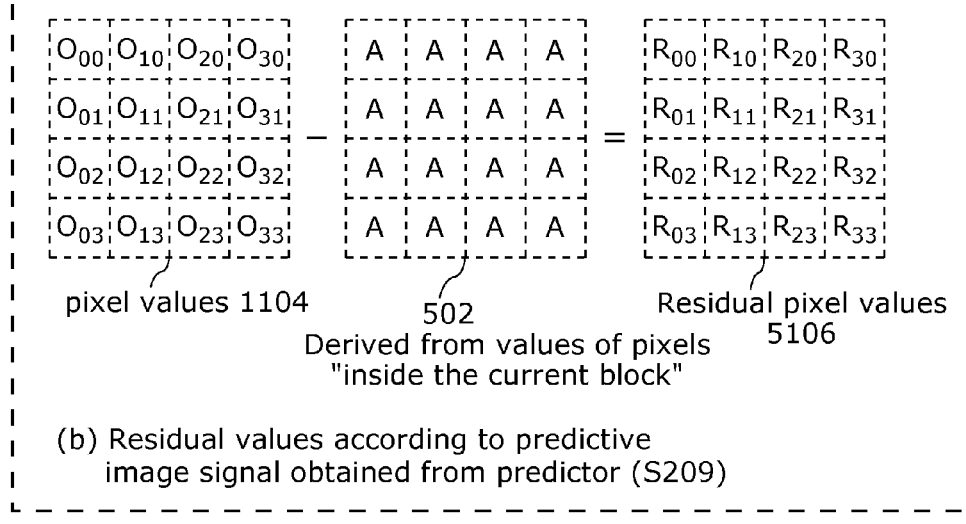
(b) Residual values according to predictive image signal obtained from predictor (S209)

FIG. 11
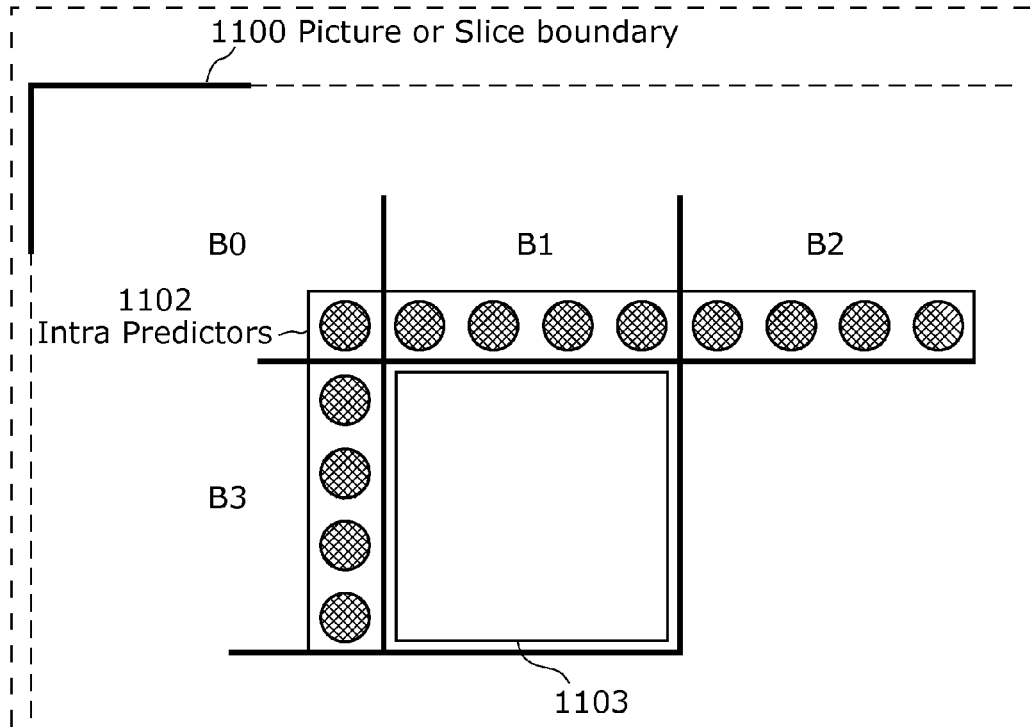
(a) Positional relationship between coding target block and intra predictors 1102 in intra coding
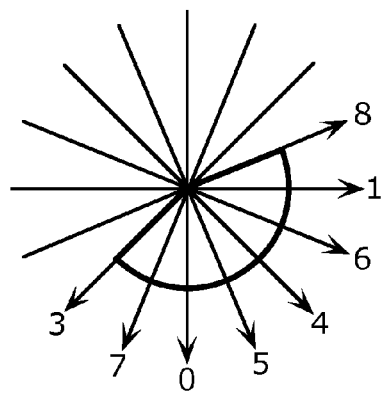
(b) Direction of predictors and prediction modes for determining predictor to be used FIG. 14
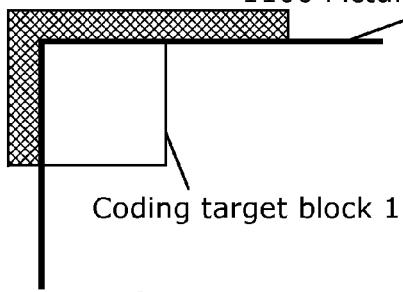
Coding target block 1103
(a) Example of block that does not refer to at least part of the intra predictors
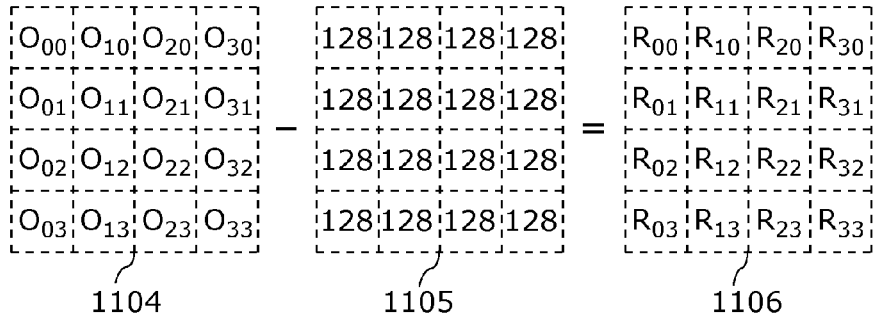
(b) Method of deriving residual values R of block 1103
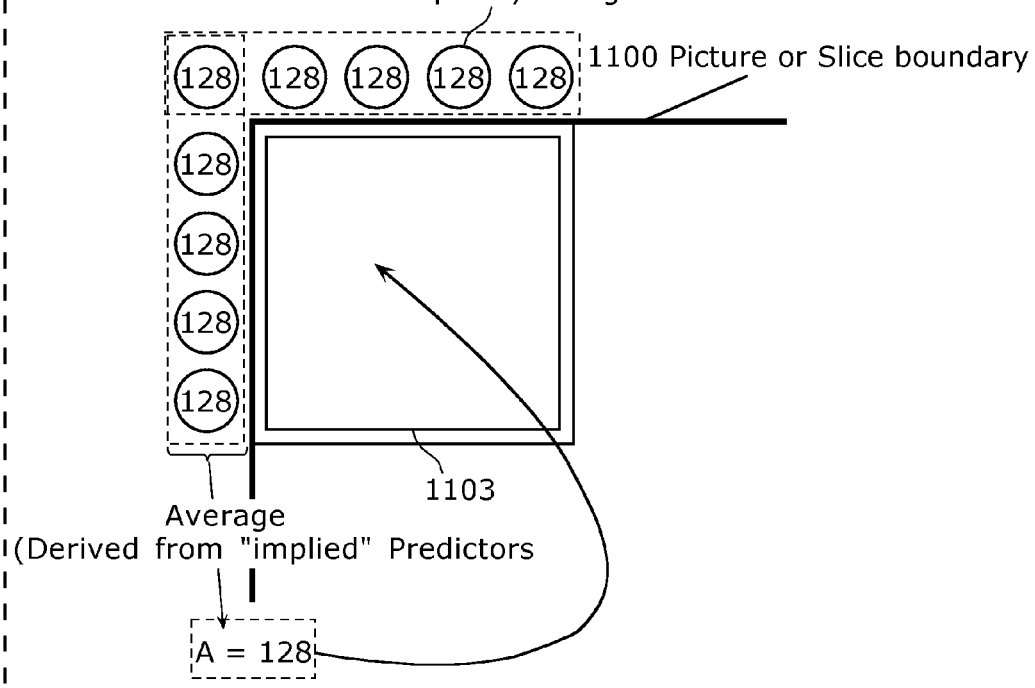
(c) Diagram for describing using relationship with DC mode prediction (mode 2)

FIG. 15
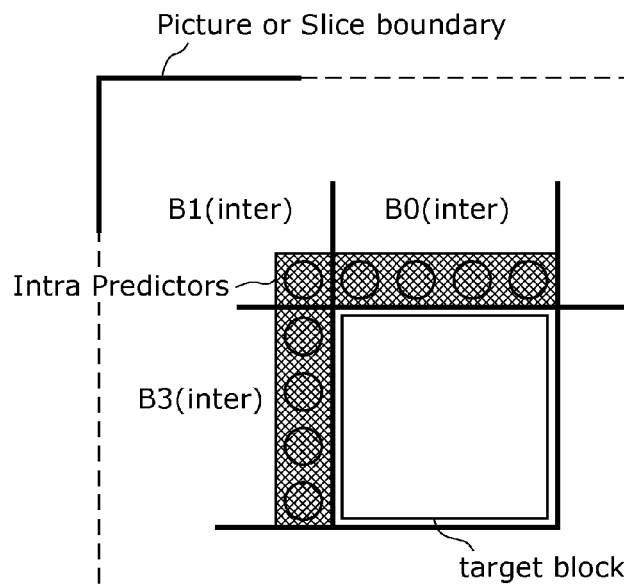
(a) When surrounding blocks of coding target block are inter predicted
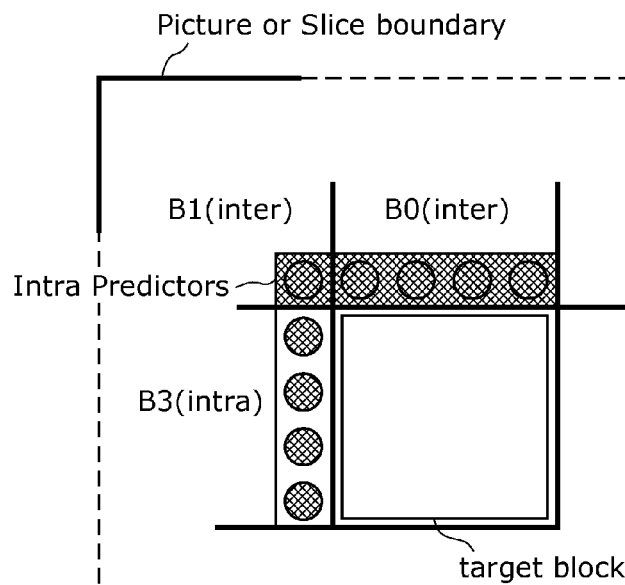
(b) When blocks at top and top left of the coding target block are inter predicted (a) When surrounding blocks of coding target block are inter predicted (b) When blocks at top and top left of the coding target block are inter predicted FIG. 26
Stream of TS packets
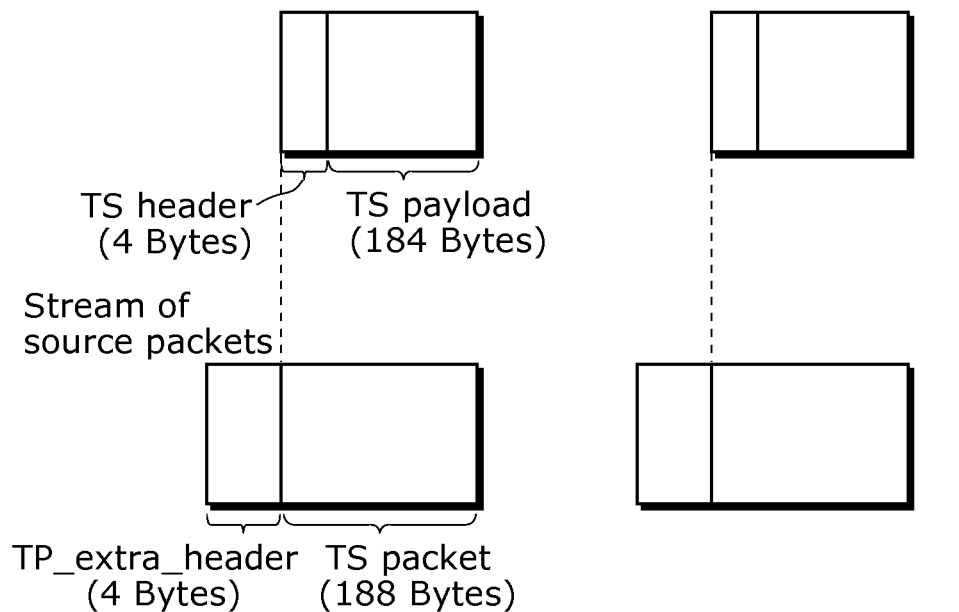
TS header (4 Bytes)  TS payload (184 Bytes)
Stream of source packets
TP_extra_header (4 Bytes)  TS packet (188 Bytes)
Multiplexed data
SPN 0 1 2 3 4 5 6 7 ···
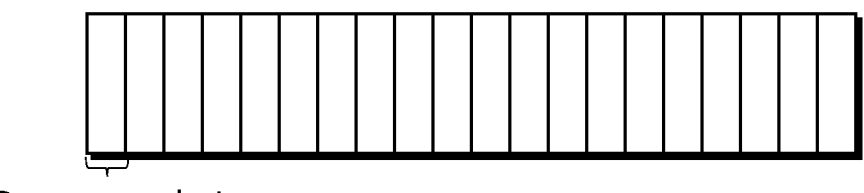
Source packet

FIG. 34

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD AND MOVING PICTURE DECODING METHOD

This application is the National Stage of International Application No. PCT/JP2012/000286, filed Jan. 18, 2012, which claims the benefit of U.S. Provisional Application No. 61/434,062, filed Jan. 19, 2011.

TECHNICAL FIELD

The present invention relates to a moving picture coding method and decoding method, and particularly relates to a method of generating a predictive value for intra coding and coding or decoding a moving picture.

BACKGROUND ART

Intra coding in moving picture coding takes advantage of spatial information inside a picture to reduce spatial redundancy of codes. In order to reduce spatial redundancy, the difference between an image signal of a coding target block and a predictive image derivable from a neighboring block is derived, and the difference value (residual value) is transformed, quantized, and coded.

FIG. 11 is a diagram for describing intra coding according to the conventional H.264/MPEG4 AVC scheme. In FIG. 11, (a) at the top of the figure shows the positional relationship between a coding target block in intra coding and intra predictors to be described later.

A boundary line 1100 in FIG. 11 is a picture boundary or slice boundary. A block 1103 in FIG. 11 is a block that is currently the target for coding by a coding apparatus.

Coding and decoding are performed sequentially, on a block-by-block basis, from the top left towards the bottom right. Therefore, at the time of coding the block 1103, the four blocks consisting of a top left block B0, a top block B1, a top right block B2, and a right block B3, which are surrounding blocks, are already coded or decoded.

Now, a predictive image P is derived from predictors called intra predictors 1102 derived from pixel values of pixels included in all or part of the decoded blocks B0, B1, B2, and B3. The pixels covered by hatching indicate intra predictors that are candidates for use.

In FIG. 11, (b) at the bottom of the figure shows directions for determining the intra predictors to be used in generating a predictive image of the coding target block 1103. The orientation of each arrow in FIG. 11 indicates that, when the coding target block 1103 is located in the direction of the arrow, the intra predictor is located at the base of the arrow.

For example, in the case of an arrow 0, the coding target block 1103 is located at the tip of the arrow 0. Furthermore, the base of the arrow 0 shows the location of the intra predictor to be used for the coding target block 1103.

In the H.264 scheme, it is possible to use modes 0, 1, 3, 4, 5, 6, 7, which respectively correspond to the seven directions indicated by arrows 8, 1, 6, 4, 5, 0, 7, and 3 in FIG. 11, and a mode called DC mode prediction (hereafter also called DC prediction mode).

The coding apparatus determines the intra predictors that are to be actually used, based on the prediction precision of the predictive image derived from the predictors included in the blocks B0, B1, B2, and B3, codes the mode to be applied to the block that is the coding target, and outputs the coded mode. In the case where the 4 pixels included in the block B1 are determined (mode 0) as the intra predictors to be used for such block, the predictive image is generated from these four pixels.

FIG. 12 is a diagram for describing in more detail the location of the intra predictors that are used in the modes corresponding to the seven directions. In the same manner as in FIG. 11, block 1103 is the current coding target block.

For example, when the intra predictors to be used are the four pixels covered in hatching included in block B1, the predictive image P is generated by using the values of the four pixels in the orientation of an arrow 1201 (Direction [0]) indicating a direction.

An arrow 1201 indicates the orientation in the case where the mode 8 is to be used. The value of an intra predictor 1205 included in the already-coded block B3 is copied, and an intra predictor 1205b is set.

FIG. 13 is a diagram for describing an intra predictor in the aforementioned DC mode (mode 2). In this mode, the average value of the pixel values of all the pixels corresponding to the pixels surrounding the coding target block (the pixels covered in hatching in FIG. 13) is the intra predictor of the coding target block 1103. This average value which is one intra predictor is applied uniformly to all pixels making up the predictive image of the coding target block 1103.

CITATION LIST

Non Patent Literature

[NPL 1] Text of Final Committee Draft of Joint Video Specification (ITU-T Rec.H.264 | ISO/IEC 14496-10 AVC), ISO/IEC JTC1/SC29/WG11 MPEG02/N4920 July 2002, Klagenfurt, AT

SUMMARY OF INVENTION

Technical Problem

For further improvement of coding efficiency, focus has been placed on intra prediction coding under a special condition. FIG. 14 shows diagrams exemplifying the special condition.

In FIG. 14, (a) at the top of the figure is a diagram showing a representative example of a block that "does not refer to at least one of the intra predictors. The coding target block 1103 in this case is in contact with the boundary line 1100 of a picture or a slice.

In the case shown in FIG. 14, the blocks in the positions of the aforementioned blocks B0, B1, B2, and B3 are not decoded, and the coding target block does not refer to any of the intra predictors (includes not using and the state where use is prohibited (the same shall apply hereinafter)).

Furthermore, for the block neighboring the coding target block 1103 to the right and which is not shown in the figure, at least part of the intra predictors (top left, top, top right) are not referred to from such block position.

In FIG. 14, (b) at the middle of the figure is a diagram for describing a method of deriving a residual value R of a block 1101 to be coded according to the conventional coding method, for a block that "does not refer to an intra predictor" (all intra predictors do not exist or are not used). It should be noted that, in FIG. 14, the size of the coding target block is 4×4, $O_{00}$ to $O_{32}$ denote pixel values of the pixels included in the coding target block.

First, the coding apparatus obtains the pixel values (indicated by reference sign 1104) of the 16 pixels $O_{00}$ to $O_{33}$ of the block 1103 which is the coding target. Next, the coding apparatus generates, as a substitute for a predictive image signal, an image signal obtained when the pixel values of all of the pixels are fixedly determined to be 128 (indicated by reference sign 1105). Next, the coding apparatus derives the residual values R (indicated by reference sign 1106) obtained by subtracting the value 128 from the pixel values of the respective pixels $O_{00}$ to $O_{33}$. Subsequently, the coding apparatus performs orthogonal transform then quantization on the residual value R, and generates a coded stream.

It should be noted that, (c) at the bottom of FIG. 14 is a diagram for describing the relationship between the predictive image obtained when the value 128 is applied to the pixel values of all of the pixels and the DC mode prediction (mode 2) in FIG. 13.

In the DC mode, the pixel values of the pixels covered in hatching in FIG. 13 are averaged, and the average value serves as the intra predictor. The derived single average value is applied uniformly to all the pixels as the pixel value of the predictive image corresponding to all of the pixels. In other words, applying the value 128 described in (b) in FIG. 14 to the pixel values of the predictive image signal is equivalent to fixedly determining all the pixel values of the pixels covered in hatching in FIG. 13 to be 128.

In this manner, in the coding method in conventional intra coding, the pixel value 128 having a low prediction precision for the respective pixel values is used, as the intra predictor of the pixel value of the respective pixels, for a block for which all the intra predictors are not present or which does not use any of the intra predictors.

Therefore, residual values $R_{00}$ to $R_{33}$ of the respective pixels of such block fluctuate significantly. In addition, the probability that coefficient values are generated up to higher frequencies for the orthogonal transform values of the residual values $R_{00}$ to $R_{33}$ increases, and the quantized transform values of the frequency coefficient values also become big. In addition, although in the subsequent variable-length coding, a coded stream having a shorter code length is normally assigned as generation probability increases, it is not possible to generate a short coded stream when the quantized transform values are uneven.

In addition, the aforementioned value "128" is implicitly used as a fixed rule between the coding apparatus and the decoding apparatus. In other words, there is no designated information in the coded stream, and the value 128 is used in the coding and decoding of the coding target block 1103.

Therefore, there is no scheme for coding and decoding intra predictors or values corresponding to the intra predictors of this special block that "does not refer to part of the intra predictors".

The present invention is conceived in view of the aforementioned circumstances and has as an object to provide a moving picture coding method and a moving picture decoding method which increase coding efficiency by generating an appropriate intra predictor.

Solution to Problem

A moving picture coding method according to an aspect of the present invention is a method of coding, on a block basis, an image signal making up a moving picture. Specifically, the moving picture coding method includes: judging whether or not is to be performed on a coding target block; (b) judging, when the result of the judgment in step (a) is TRUE, whether or not the coding target block is a block that does not refer to at least part of intra predictors; (c) determining an intra predictor based on image information of the coding target block, when the result of the judgment in step (b) is TRUE; and (d) deriving a predictive image signal for the coding target block, using the intra predictor.

It should be noted that the case where "the result of the judgment in step (a) is TRUE" refers to the case where intra coding is to be performed on the coding target block, and the case where "the result of the judgment in step (a) is FALSE" refers to the case where a coding method other than intra coding (typically, inter coding) is used on the coding target block.

In addition, the moving picture coding method may include (e) coding the intra predictor determined in step (c) as intra predictor-related information for the coding target block, when the result of the judgment in step (b) is TRUE.

It should be noted that the case where "the result of the judgment in step (b) is TRUE" refers to the case where the coding target block is a block that does not refer to at least part of intra predictors, and the case where "the result of the judgment in step (b) is FALSE" refers to the case where the coding target block is a block that refers to all of the intra predictors.

Furthermore, in step (b), the coding target block may be determined to be a block that does not refer to at least part of intra predictors, when a surrounding block of the coding target block is inter predicted.

Furthermore, in step (b), the coding target block may be determined to be a block that does not refer to at least part of intra predictors, when surrounding blocks of the coding target block have block sizes smaller than a block size of the coding target block and one of the surrounding blocks is inter predicted.

Furthermore, in step (c), an average value for the block represented by the image signal may be determined as the intra predictor.

Furthermore, in step (c), when the image signal is coded on a block basis using vertical-direction prediction, intra predictors may be generated by replicating pixel values of pixels included in a topmost row among pixels inside the block represented by the image signal.

Furthermore, in step (c), the intra predictors corresponding to the number of the pixels inside the block represented by the image signal may be generated by replicating, in a vertical direction, the pixel values of the pixels included in the topmost row among the pixels inside the block.

Furthermore, in step (c), when the image signal is coded on a block basis using horizontal-direction prediction, intra predictors may be generated by replicating pixel values of pixels included in a leftmost column among pixels inside the block represented by the image signal.

Furthermore, in step (c), the intra predictors corresponding to the number of the pixels inside the block represented by the image signal may be generated by replicating, in a horizontal direction, the pixel values of the pixels included in the leftmost column among the pixels inside the block.

Furthermore, in step (c), when (i) surrounding blocks neighboring the coding target block to a top have block sizes smaller than a block size of the target coding block, (ii) one of the surrounding blocks is inter predicted, and (iii) the coding target block is to be coded using vertical-direction prediction, pixel values of pixels neighboring the inter predicted surrounding block, among pixel values of pixels represented by an image signal for the coding target block, may be determined as intra predictors.

Furthermore, in step (c), when another one of the surrounding blocks neighboring the coding target block to the top is intra predicted, pixel values of pixels neighboring the coding target block, among pixel values of pixels of the intra predicted surrounding block, may be determined as the intra predictors.

A moving picture decoding method according to an aspect of the present invention is a method of decoding a coded stream, which is obtained by coding on a block basis an image signal making up a moving picture, to reconstruct the moving picture. Specifically, the moving picture decoding method includes: (a) extracting, from the coded stream, intra predictor-related information generated from a value of a pixel of a predetermined block; (b) determining an intra predictor for the predetermined block, based on the intra predictor-related information; and (c) generating a predictive image signal of a decoding target block using the determined intra predictor.

Furthermore, in step (b), an average value for a block represented by the image signal may be determined as the intra predictor.

Furthermore, in step (b), when the coded stream is to be decoded on a block basis using vertical-direction prediction, intra predictors may be determined by replicating pixel values of pixels included in a topmost row, among pixels in the block represented by the image signal.

Furthermore, in step (b), the intra predictors corresponding to the number of the pixels inside the block represented by the image signal may be generated by replicating, in a vertical direction, the pixel values of the pixels included in the topmost row among the pixels inside the block.

Furthermore, in step (b), when the coded stream is to be decoded on a block basis using horizontal-direction prediction, intra predictors may be determined by replicating pixel values of pixels included in a leftmost column, among pixels in the block represented by the image signal.

Furthermore, in step (b), the intra predictors corresponding to the number of the pixels inside the block represented by the image signal may be generated by replicating, in a horizontal direction, the pixel values of the pixels included in the leftmost column among the pixels inside the block.

Furthermore, in step (b), when (i) surrounding blocks neighboring the coding target block to a top have block sizes smaller than a block size of the target coding block, (ii) one of the surrounding blocks is inter predicted, and (iii) the coding target block is to be coded using vertical-direction prediction, pixel values of pixels neighboring the inter predicted surrounding block, among pixel values of pixels represented by an image signal for the coding target block, may be determined as intra predictors.

Furthermore, in step (b), when another one of the surrounding blocks neighboring the coding target block to the top is intra predicted, pixel values of pixels neighboring the coding target block, among pixel values of pixels of the intra predicted surrounding block, may be determined as the intra predictors.

It should be noted that the present invention can be realized not only as a moving picture coding method and a moving picture decoding method such as those described above, but also as an integrated circuit that realizes the respective steps of the moving picture coding method and moving picture decoding method, and a program which causes a computer to execute such steps. Moreover, it should be obvious that such a program can be distributed via a recording medium such as a CD-ROM and so on, or a transmission medium such as the Internet, and so on.

Advantageous Effects of Invention

According to the present invention, it is possible to generate an appropriate predictive signal even during coding and decoding of a block that originally does not use an intra predictor in intra prediction.

BRIEF DESCRIPTION OF DRAWINGS

FIG. 5 shows diagrams for describing a method of determining an intra predictor according to a first example.

FIG. 11 shows diagrams for describing an intra prediction coding method according to prior art.

FIG. 14 shows diagrams for describing a focus of the present invention in intra prediction coding.

FIG. 15 shows examples of combinations of prediction coding of surrounding blocks.

FIG. 26 is a diagram showing a structure of TS packets and source packets in the multiplexed data.

FIG. 34 is a diagram showing an example of a look-up table in which video data standards are associated with driving frequencies.

DESCRIPTION OF EMBODIMENTS

Embodiment 1

Figure 1:
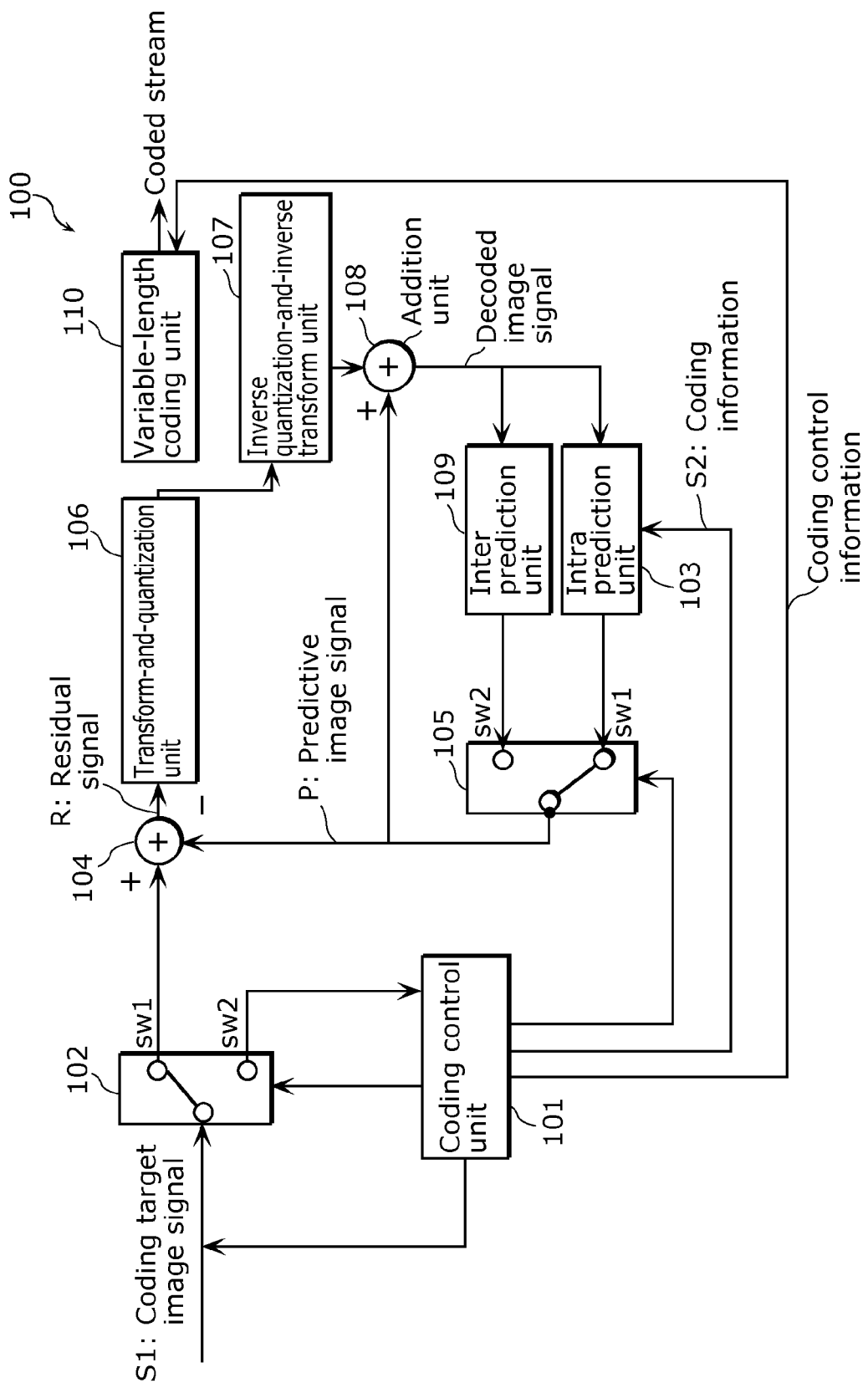
FIG. 1 is a block diagram showing a configuration of an image coding apparatus according to Embodiment 1 of the present invention.

FIG. 1 is a function block diagram of an image coding apparatus 100 in Embodiment 1.

The image coding apparatus 100 includes a coding control unit 101, a switch 102, an intra prediction unit 103, a difference unit 104, a transform-and-quantization unit 106, an inverse quantization-and-inverse transform unit 107, an addition unit 108, a switch 105, an inter prediction unit 109, and a variable-length coding unit 110.

The coding control unit 101 extracts, from an input image signal, a control signal corresponding to a coding target image signal S1, and switches the switch 102 and/or the switch 105 based on a judgment result. Furthermore, the coding control unit 101 performs a predetermined processing on the coding target image signal S1, and outputs coding information S2.

The switch 102 switches between outputting the coding target image signal S1 to the difference unit 104 and the coding control unit 101, in accordance with a signal from the coding control unit 101.

The difference unit 104 derives a difference value (residual value) between the coding target image signal S1 of a certain block obtained from the switch 102 and a predictive image signal P obtained from the switch 105, and outputs a residual signal R to the transform-and-quantization unit 106.

The transform-and-quantization unit 106 generates quantized transform coefficients by performing quantization after transforming the residual signal obtained from the difference unit 104 into frequency coefficient values, and outputs the generated quantized transform coefficients to the inverse quantization-and-inverse transform unit 107 and the variable-length coding unit 110.

The inverse quantization-and-inverse transform unit 107 performs inverse transform on the quantized transform coefficients obtained from the transform-and-quantization unit 106 to generate frequency coefficient values, and, in addition, performs inverse transform on the frequency coefficient values to generate a reconstructed residual signal R', and outputs the reconstructed residual signal R' to the addition unit 108.

The addition unit 108 adds-up the reconstructed residual signal R' obtained from the inverse quantization-and-inverse transform unit 107 and the predictive image signal P obtained from the switch 105 to generate a decoded image signal, and outputs the generated decoded image signal to the intra prediction unit 103 and the inter prediction unit 109.

The intra prediction unit 103 generates the predictive image signal P using the decoded image signal obtained from the addition unit 108 or the coding target image signal S1 obtained from the coding control unit 101, and outputs the generated predictive image signal P to the switch 105. The inter prediction unit 109 generates the predictive image signal P using the decoded image signal obtained from the addition unit 108, and outputs the generated predictive image signal P to the switch 105.

The switch 105 switches between outputting the predictive image signal P output from the intra prediction unit 103 and the predictive image signal P output from the inter prediction unit 109, in accordance with a control signal from the coding control unit 101.

The variable-length coding unit 110 performs variable-length coding on the quantized transform coefficients of each input block or on various control signals to generate a coded stream.

Next, the operation of the image coding apparatus 100 shall be described.

Figure 2:
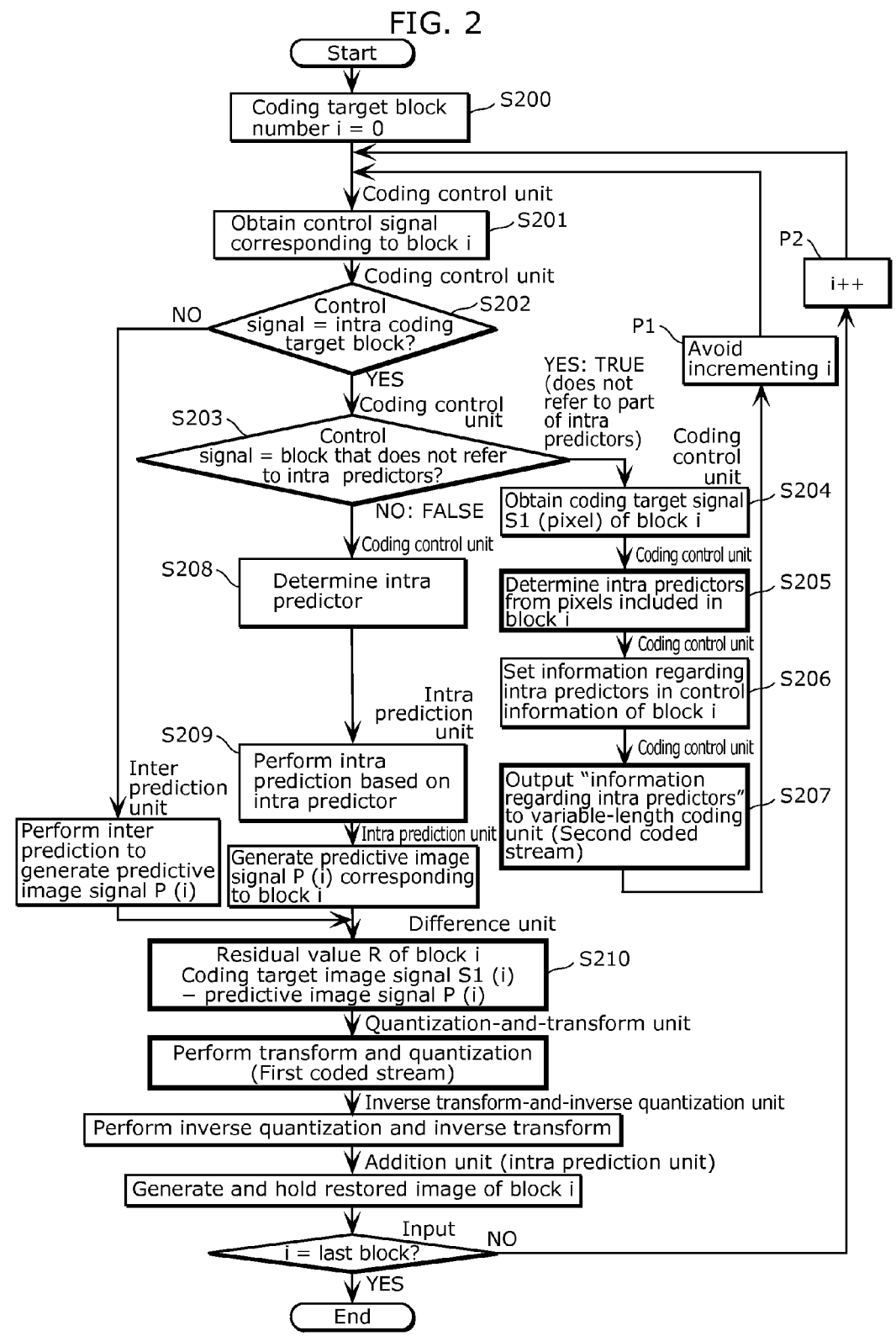
FIG. 2 is a flowchart showing an operation of the image coding apparatus.

FIG. 2 is a process flowchart for the image coding apparatus 100. In the figure, reference signs are given to important steps.

First, the image coding apparatus 100 obtains the first coding target block which is included in a picture or a slice (S200). In the example in FIG. 2, the number i of the first block is 0 (S200)

Next, the coding control unit 101 obtains a control signal corresponding to a block i (S201). The control signal of the block i can be obtained from a control signal that is set in any of various units such as slice-units, picture-units, sequence-units, or the like.

Next, the coding control unit 101 judges, according to the obtained control signal, whether or not the block i is a block to be intra coded (S202). Then, when the judgment result indicates that the block i (i=0) is a block to be intra coded, the process proceeds to the judgment in step S203 (YES in S202).

Next, the coding control unit 101 judges whether or not the control signal represents a block which "refers to an intra predictor" (S203). In judging whether or not the block i is a block that refers to an intra predictor, various conditions are set. One example is that, when the block i (i=0) is located at the top left edge of the picture, it is judged that the block i is not a block that refers to an intra predictor. Therefore, the result of the judgment for the block (i=0) is YES.

Next, the coding control unit 101 obtains the coding target image signal S1 (pixel) included in the block i (S204). When the size of the block is 4×4, the coding control unit 101 obtains data corresponding to the pixel values of 16 pixels at the top left edge (S204).

Next, the coding control unit 101 determines the intra predictor from the pixels included in the block i (S205). The method for the determining in step S205 shall be described in detail later since it is one of the main parts of the present invention.

Next, the coding control unit 101 sets information relating to the intra predictor that was determined to the control information corresponding to the block i (i=0) (S206).

Next, the coding control unit 101 outputs the information relating to the intra predictor that was determined, as a second coded stream, to the variable-length coding unit 110 (S207). The intra predictor-related information may include, in addition to the information relating to the intra predictor that was determined, a mode number which is the application direction of the intra predictor.

Here, the process returns to step S201 without incrementing the block number i=0 (P1 in FIG. 2). Therefore, the block number remains at 0 (indicating the top left edge). Therefore, the image coding apparatus 100 can perform the process for block 0 again.

In addition, the coding control unit 101 once again obtains control information corresponding to block i (i=0) (repeated S201). Furthermore, the coding control unit 101 judges whether or not the control signal represents a block to be intra coded (repeated S202). When the judgment result in step S202 indicates that the control signal represents a block to be intra coded, the process proceeds to step S203.

In step S203, this time around, the control information for the block i (i=0) indicates a block that refers to an intra predictor. This is because, in step S206, intra predictor-related information is set to the control information of the block i (i=0).

The coding control unit 101 determines the intra predictor for the block i (i=0), based on the set control information (S208). For the determination here, it is sufficient to just follow the intra predictor-related information set in the control information in step S206.

The intra prediction unit 103 also performs intra prediction for the block (i=0) which is originally at the top left edge, based on the intra predictor determined from the image signal of the block (i=0) (S209). Subsequently, the intra prediction unit 103 generates a predictive image signal P (i, i=0) corresponding to the block i.

Thus, the main operations in the intra coding method used by the image coding apparatus 100 in Embodiment 1 are as described above.

It should be noted that in the case where the process returns to step S202 and a block i (i=k) is not a block to be intra coded (S202), the inter prediction unit 109 performs inter prediction and generates a predictive image signal P (i=k).

The difference unit 104 derives a residual value R=k) from a coding target image signal S1 (i=k) and a predictive image signal P (i) of the block i (S210).

The transform-and-quantization unit 106 performs transform and quantization on the residual value R obtained from the difference unit 104, and outputs the result as a first coded stream to the inverse quantization-and-inverse transform unit 107 and the variable-length coding unit 110.

The inverse quantization-and-inverse transform unit 107 performs inverse quantization and inverse transform on the first coded stream obtained from the transform-and-quantization unit 106 to derive a residual value R' (i=k) for the block (i=k).

The addition unit 108 adds-up the residual value R' obtained from the inverse quantization-and-inverse transform unit 107 and the predictive image signal P obtained from the switch 105 to generate a reconstructed image signal for the block i, and causes the reconstructed image signal to be held in the intra prediction unit 103 and the inter prediction unit 109.

Lastly, the image coding apparatus 100 continues this coding while incrementing i, until the block i becomes the last block (P2).

Thus, the operational flow for the image coding apparatus 100 in Embodiment 1 is as described above.

In this manner, the image coding apparatus 100 in Embodiment 1 realizes, for the coding target block i, the determining of the "intra predictor" for block i=0 using the pixel value for block i=0, according to the judgment in step S203 (S205), and the coding of the "intra predictor-related information" (second coded stream: S207).

It should be noted that, although this operational flow is described according to the relationships of the respective functions of the image coding apparatus 100 in FIG. 1, the operational flow may be executed by a single control unit.

Moreover, it is described that inter prediction and intra prediction are alternatively executed according to the result of the judgment in step S202. However, it is also acceptable to perform the predictive image generation by the intra prediction unit 103 (S209) and the predictive image generation by the inter prediction unit 109 in parallel, and determine, as the predictive image signal, the one with the higher predictive image signal prediction precision.

Figure 3:
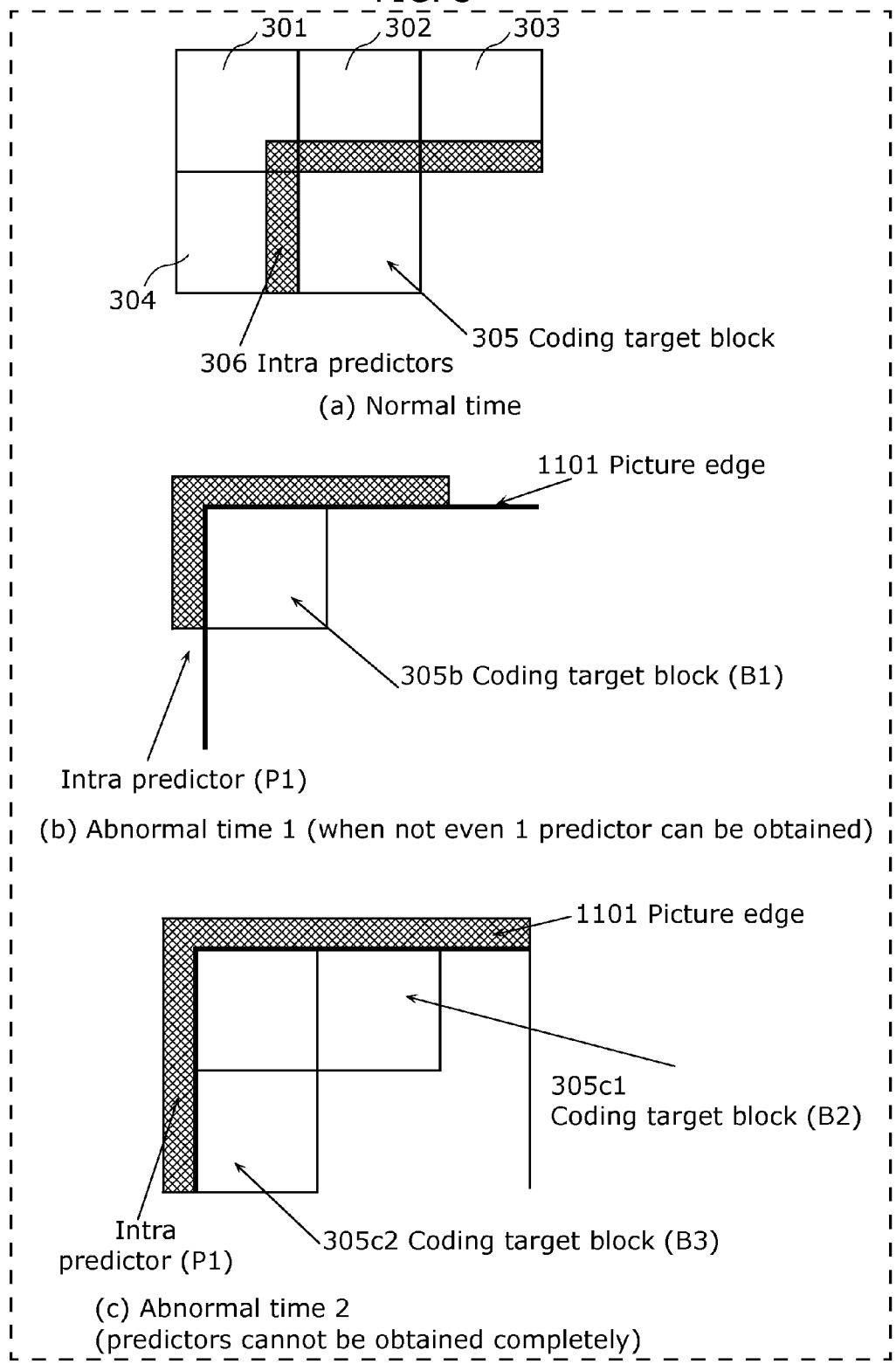
FIG. 3 shows diagrams for describing a positional relationship between a coding target block and intra predictors.

FIG. 3 shows diagrams for describing the judgment for "whether or not the block is a block that does not refer to at least part of the intra predictors" in step S203 in FIG. 2. FIG. 3 shows diagrams for describing the positional relationship between the coding target block and the intra predictors in the case where the judgment indicates TRUE (i.e., a non-referring block). FIG. 3 shows diagrams for describing the case of coding from the top left block of a picture (or a single slice) towards the bottom right block. In FIG. 3, lines or blocks having the same meaning as those in FIG. 11 are assigned the same reference sign.

In FIG. 3, (a) at the top of the figure is a diagram showing the positional relationship between a current coding target block and intra predictors at a normal time (when coding a block for which intra predictors are present). A coding target block 305 in FIG. 3 denotes a block that is currently the coding target. Blocks 301 to 304 in FIG. 3 are blocks that have already been coded when the current coding target block (n) is to be coded. The intra predictors 306 in FIG. 3 denotes pixels (or pixel values; the same shall apply hereinafter) that are referred to by the coding target block. In this manner, at a normal time, the coding target block 305 which is the current coding target can use, as an intra predictor, any one or all of the pixel values (or the frequency coefficient values) of the pixels included in each of the coded blocks 301 to 304 to the top left, the top, the top right, and the left of block 305.

In such a case, the coding control unit 101 judges FALSE in the judgment for "whether or not the coding target block is a block that does not refer to at least part of the intra predictors" (S203).

In FIG. 3, (b) at the middle of the figure is a diagram showing a position of a coding target block 305b in a picture (or a slice; the same shall apply hereinafter) for an abnormal time (when coding a block for which intra predictors are not present; the same shall apply hereinafter).

At the time of coding the coding target block 305b, none of the blocks to the top left, the top, the top right, and the left have been coded. Therefore, in this case, not a single intra predictor can be obtained from such position.

In such a case, the coding control unit 101 judges TRUE (a non-referring block) in the judgment for "whether or not the coding target block is a block that does not refer to at least part of the intra predictors".

In FIG. 3, (c) at the bottom of the figure is a diagram showing a position in a single picture (or a single slice) of coding target blocks 305c1 and 305c2 in an abnormal time (when coding a block for which intra predictors are not present; the same shall apply hereinafter). At present, the positional relationship in the case where the block that is the coding target is the coding target block 305b is the same as in (b) in FIG. 3. When the block that is the current coding target is a coding target block 305c1 neighboring immediately to the left and which is the next subsequent block after the coding target block 305b in coding order, the block that can be referred to is only the block 305b to the left, and the blocks to the top left, top, and top right cannot be referred to.

In the same manner, when the block that is currently the coding target is the coding target block 305c2 which is located below the coding target block 305b, the top and top right blocks can be referred to but the left and top left blocks cannot be referred to.

Therefore, as in the case of (b) in FIG. 3, in (c) in FIG. 3, the coding control unit 101 also judges TRUE (a non-referring block) in the judgment for "whether or not the coding target block is a block that does not refer to at least part of the intra predictors".

It should be noted that the judgment for "whether or not the coding target block is a block that does not refer to at least part of the intra predictors" takes into consideration, not only the position of the coding target block, but also whether or not "referring to surrounding blocks" is prohibited.

For example, when part or all of the surrounding blocks is an "inter coded" block, the coding control unit 101 can also judge TRUE (a non-referring block) in the judgment for "whether or not the coding target block is a block that does not refer to at least part of the intra predictors".

In FIG. 15, (a) illustrates a case where all of the surrounding blocks (B0, B1, B2) of the coding target block are inter coded. In such a case, the pixel values of the pixels of the surrounding blocks cannot be used as intra predictors. As such, the coding control unit 101 judges TRUE in the judgment for "whether or not the coding target block is a block that does not refer to at least part of the intra predictors". In FIG. 15, (b) illustrates a case where inter prediction coding is performed on part of the surrounding blocks (B0, B1) of the coding target block. In such a case, the pixel values of the pixels of the top left neighboring and top neighboring blocks of the coding target block are used as intra predictors. As such, the coding control unit 101 judges TRUE in the judgment for "whether or not the coding target block is a block that does not refer to at least part of the intra predictors".

Figure 16:
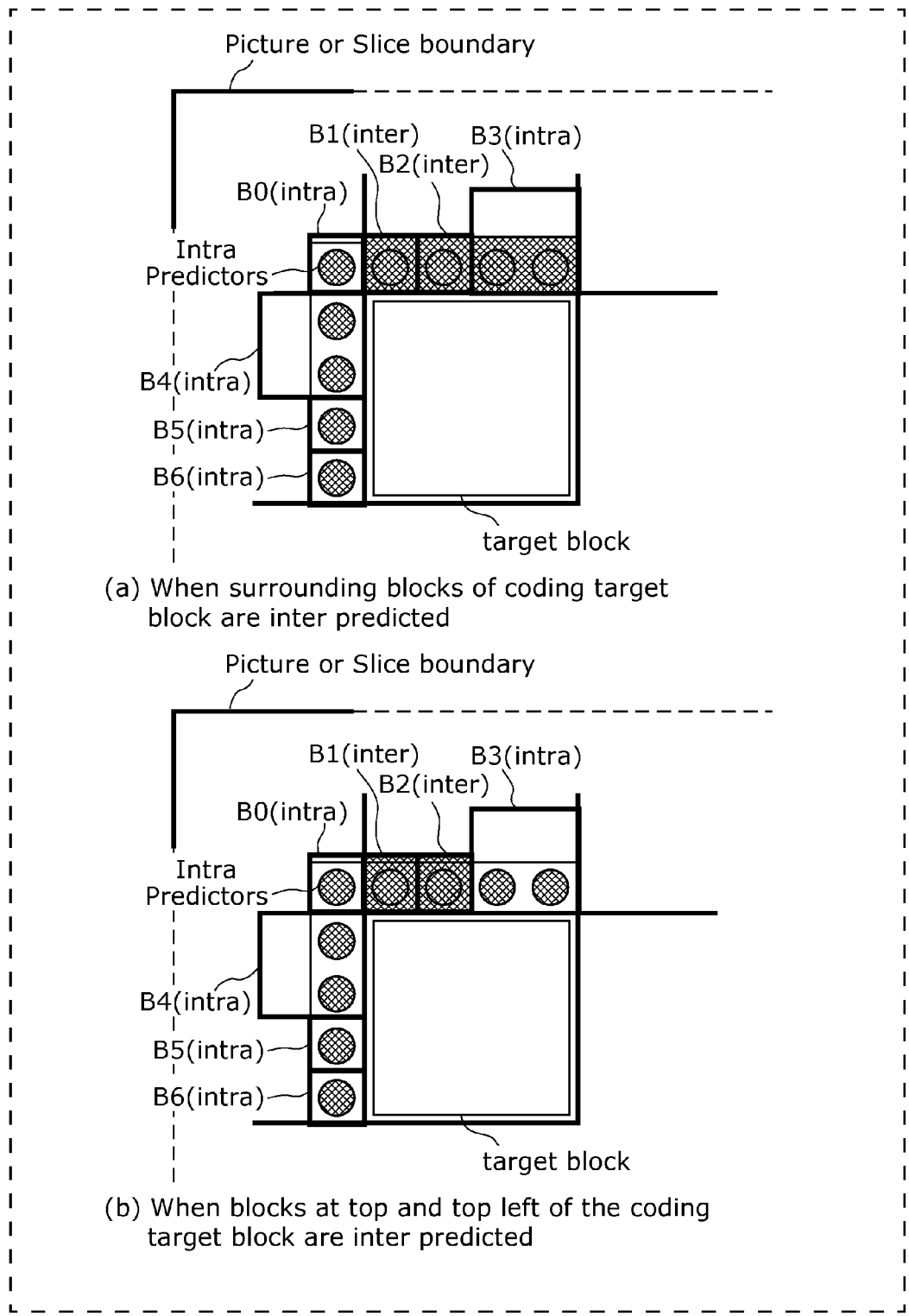
FIG. 16 shows examples for a case where the coding block size of surrounding blocks is smaller than the block size of the coding target block.

Furthermore, FIG. 16 shows examples for the case where the coding block size of the surrounding blocks is smaller than the block size of the coding target block, in FIG. 16, (a) illustrates a case where, for example, as a method of suppressing error propagation, the pixels of surrounding blocks that are coded in the inter prediction mode are not used as intra predictors (constrained intra prediction mode). The constrained intra prediction mode is designated in stream-units.

As in (a) in FIG. 16, in the case where part of the top neighboring blocks of the coding target block is inter predicted, the pixel values of all the pixels of the top neighboring blocks of the coding target block cannot be used as intra predictors. As such, the coding control unit 101 judges TRUE in the judgment for "whether or not the coding target block is a block that does not refer to at least part of the intra predictors".

In (b) in FIG. 16, in the case where part of the top neighboring blocks of the coding target block is inter predicted, the pixel values of the pixels of part of the top neighboring blocks of the coding target block cannot be used as intra predictors. As such, the coding control unit 101 judges TRUE in the judgment for "whether or not the coding target block is a block that does not refer to at least part of the intra predictors".

It should be noted that although, in the examples in FIG. 16, the block sizes of the surrounding blocks include sizes that are ½ and ¼ the size of the coding target block, judgment is performed in the same manner even when there is a block with an even smaller size.

Figure 4:
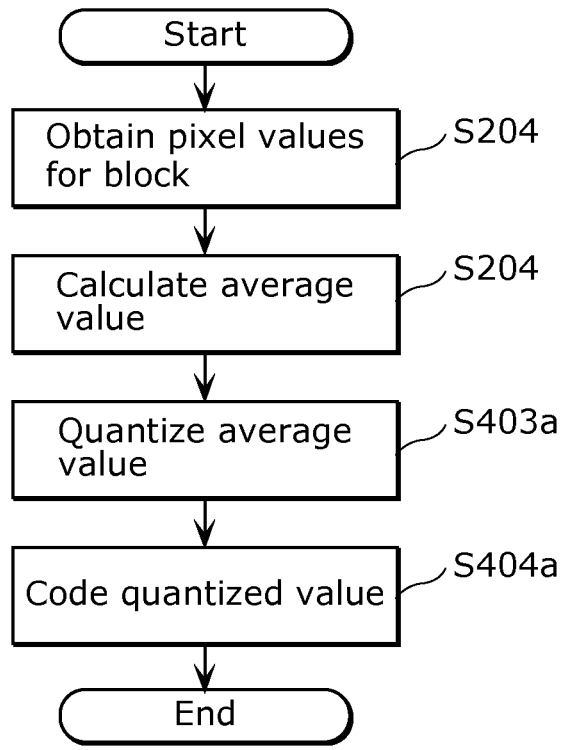
FIG. 4 is a flowchart showing an example of a method of coding intra predictor-related information.

FIG. 4 is a flowchart showing an example of the operation of the image coding apparatus 100 in the case of "determining the intra predictor from the pixels included in the block i" in step S205.

First, the coding control unit 101 obtains the pixels values of the pixels $O_{00}$ to $O_{33}$ and so on included in a picture edge block which is the block currently targeted for coding (step S204 in FIG. 2).

Next, in FIG. 4, a case where the average value is used in order to derive the intra predictor of the block 0 from the coding target block (block 0) itself shall be described as an example of the determining of the intra predictor in step S205 in FIG. 2. It should be noted that the intra predictor may undergo frequency coefficient transform, quantization, and coding, and be output as a coded stream (S403a, S404a).

Example 1 for Intra Predictor Determining

FIG. 5 describes in detail a case where the deriving of the average value in FIG. 4 is used in the determining of the intra predictor in step S205 in FIG. 2.

In FIG. 5, (b) at the bottom of the figure is a diagram for describing the intra predictor according to Example 1, and the predictive value that can be obtained from the intra predictor. In Example 1 shown in FIG. 4, the coding control unit 101 derives a single value (for example, the average value) as statistical processing of the pixel values of an input block itself, and this average value is determined as the inter predictor of the block. An average value A in (b) in FIG. 5 denotes the average value (or an average value converted with a predetermined precision, the same shall apply hereinafter) of the pixel values of pixels $O_{00}$ to $O_{33}$.

The intra prediction unit 103 generates the predictive image P using this intra predictor. Furthermore, the difference unit 104 applies the average value A obtained from the single intra predictor obtained through the statistical processing to all of the pixels (pixels $O_{00}$ to $O_{33}$) (denoted using the reference sign 502 in FIG. 5), to derive the residual values $R_{00}$ to $R_{33}$. The reference sign 5106 in FIG. 5 denotes the derived residual values (R) of the respective pixels $O_{00}$ to $O_{33}$.

As shown in FIG. 5, the coding control unit 101 in the present invention determines the intra predictors for the pixels $O_{00}$ to $O_{33}$ using the single intra predictor which takes on a variable value. Here, unlike in the prior art, 128 (denoted by reference sign 1105 in FIG. 1) which is an implicit fixed value is not used as the value, and an appropriate value according to the pixel values of the block itself is used (denoted by reference sign 502 in FIG. 5).

In this manner, according to the present invention, the predictive image is derived, not by using a uniform value 128 as the intra predictor, but by using, as the intra predictor, a relevant value derived from the block itself, for example, "a variable value derived from pixel values of the current block" such as the average value, or the like, of the pixels. Subsequently, since the difference unit 104 uses this value in subtraction, the residual values (denoted by reference sign 5106 in FIG. 5) become smaller than in the conventional method. As a result, the fluctuation in the residual values $R_{00}$ to $R_{33}$ becomes smaller than in the conventional method, and thus the probability that the frequency-transformed values for the residual values $R_{00}$ to $R_{33}$ will become smaller improves, and the values obtained by performing quantization on the frequency coefficient values can be decreased.

In addition, the coding control unit 101 in Example 1, codes information related to this intra predictor, and outputs the coded information as the second coded stream (S207 in FIG. 2). This coded information is output by a variable-length coding unit, for example, as a coded stream included in a slice header or a picture parameter set, or the like. In this manner, since the value 128 is not used as an implicit rule, the intra predictor that should be used can be shared explicitly by the coding apparatus and the decoding apparatus.

Here, the increase in coded streams shall be described. Only a value corresponding to a single average value A is added to the coded stream. As such, an increase coded streams overall can be suppressed. It should be noted that, although deriving the average value as the value of the intra predictor to be applied to all of the pixels is shown as an example of statistical processing in Example 1, the value may be a value obtained using other statistical processing. Furthermore, although the pixel values of the pixels $O_{00}$ to $O_{33}$ are used, it is acceptable to have statistical processing that uses the pixel values of part of the pixels.

It should be noted that in this example, only one value is coded as the "intra predictor-related information" (S207). In this case, when surrounding intra predictors are not present or not used, coding in predictive mode for the intra predictor-related information is not necessary.

Example 2 for Inter Predictor Determining

Figure 6:
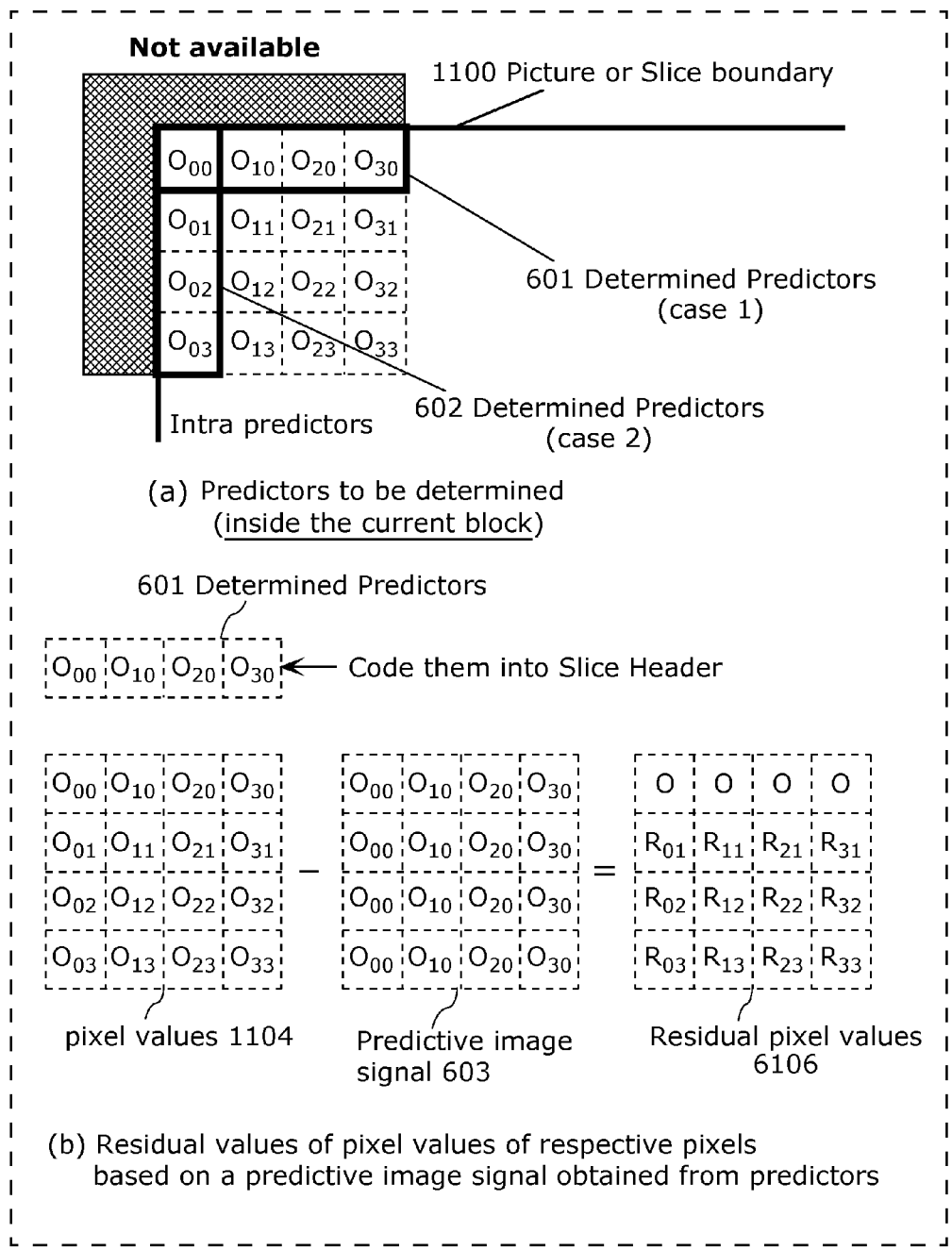
FIG. 6 shows diagrams for describing a method of determining an intra predictor according to a second example.

FIG. 6 describes a second determining example for the determining of the intra predictor in step S205 in FIG. 2.

In (a) at the top of FIG. 6, in the case where intra predictors of a reference block in the upward direction in FIG. 6 cannot be obtained (Case 1), the coding control unit 101 determines the pixel values of the four pixels $O_{00}$, $O_{10}$, $O_{20}$, and $O_{30}$ as intra predictors related to the pixel values of the current block.

This is because, supposing that intra predictors of the block in the upward direction were present for the coding target block, the pixel values of the four pixels $O_{00}$, $O_{10}$, $O_{20}$, and $O_{30}$ would be the most probable pixel values for the pixel values of the coding target block.

Therefore, as in (a) at the top of FIG. 6, in the case where, for example, intra predictors of a reference block in the leftward direction in FIG. 6 cannot be obtained (Case 2), the coding control unit 101 determines the pixel values of the four pixels $O_{00}$, $O_{01}$, $O_{02}$, and $O_{03}$ as intra predictors of the variable value related to the pixel values of the current block.

In FIG. 6, (b) at the bottom of the figure is a diagram describing a method of determining the variable value from four intra predictors in the case of Case 1. As shown in (b) in FIG. 6, in the case where, for example, intra predictors of the block in the upward direction in FIG. 6 cannot be obtained, the pixel value of the pixel $O_{00}$ is determined as the inter predictors of the four pixels $O_{00}$, $O_{01}$, $O_{02}$, and $O_{03}$.

Furthermore, the pixel value of the pixel $O_{10}$ is determined as the inter predictors of the four pixels $O_{10}$, $O_{11}$, $O_{12}$, and $O_{13}$. In the same manner, the pixel value of the pixel $O_{30}$ is determined as the inter predictors of the four pixels $O_{30}$, $O_{31}$, $O_{32}$, and $O_{33}$.

The difference unit 104 subtracts predictive image signals (denoted by reference sign 603) derived from the intra predictors derived from pixel values (denoted by reference sign 1104) of pixels included in the coding target block, from the pixel values of the pixels included in the coding target block itself, to derive residual values (denoted by reference sign 6106) of the respective pixels. In FIG. 6, the residual values for the four pixels $O_{00}$, $O_{01}$, $O_{02}$, and $O_{03}$ are the residual values 0, $R_{01}$, $R_{02}$, and $R_{03}$. Furthermore, the residual values for the pixel values of the four pixels $O_{30}$, $O_{31}$, $O_{32}$, and $O_{33}$ are the resistance values 0, $R_{31}$, $R_{32}$, and $R_{33}$.

In this manner, according to the present invention, "a variable value related to pixel values of the current block" is used as an intra predictor, instead of using a fixed value that is not related to the transforming of the pixel values of the block as in the conventional method.

Since a value that is in accordance with the pixel values of pixels making up a block is used as a predictive value, the residual values (denoted by reference sign 6106) becomes smaller than in the conventional method. Since the fluctuation in the residual values $R_{00}$ to $R_{33}$ is smaller than in the conventional method, the probability that the frequency-transformed values for the residual values $R_{00}$ to $R_{33}$ will become smaller increases, and the values obtained by performing quantization on the frequency coefficient values can be decreased.

In addition, the coding control unit 101 in Example 2 outputs the values of the four pixels as the "intra predictor-related information" of the block.

Only the pixel values of part of the pixels, that is, pixels $O_{00}$, $O_{10}$, $O_{20}$, and $O_{30}$, are added to the coded stream that is generated. As such, it is possible to suppress the increase in the amount of additional information compared to when all the pixel values are used. It should be noted that, although all the pixel values of the pixels $O_{00}$, $O_{10}$, $O_{20}$, and $O_{30}$ of the first row are used as intra predictors in Example 1, it is also possible to use, as the intra predictors, the pixel values of part of these pixels.

Example 3 for Intra Predictor Determining

Figure 7:
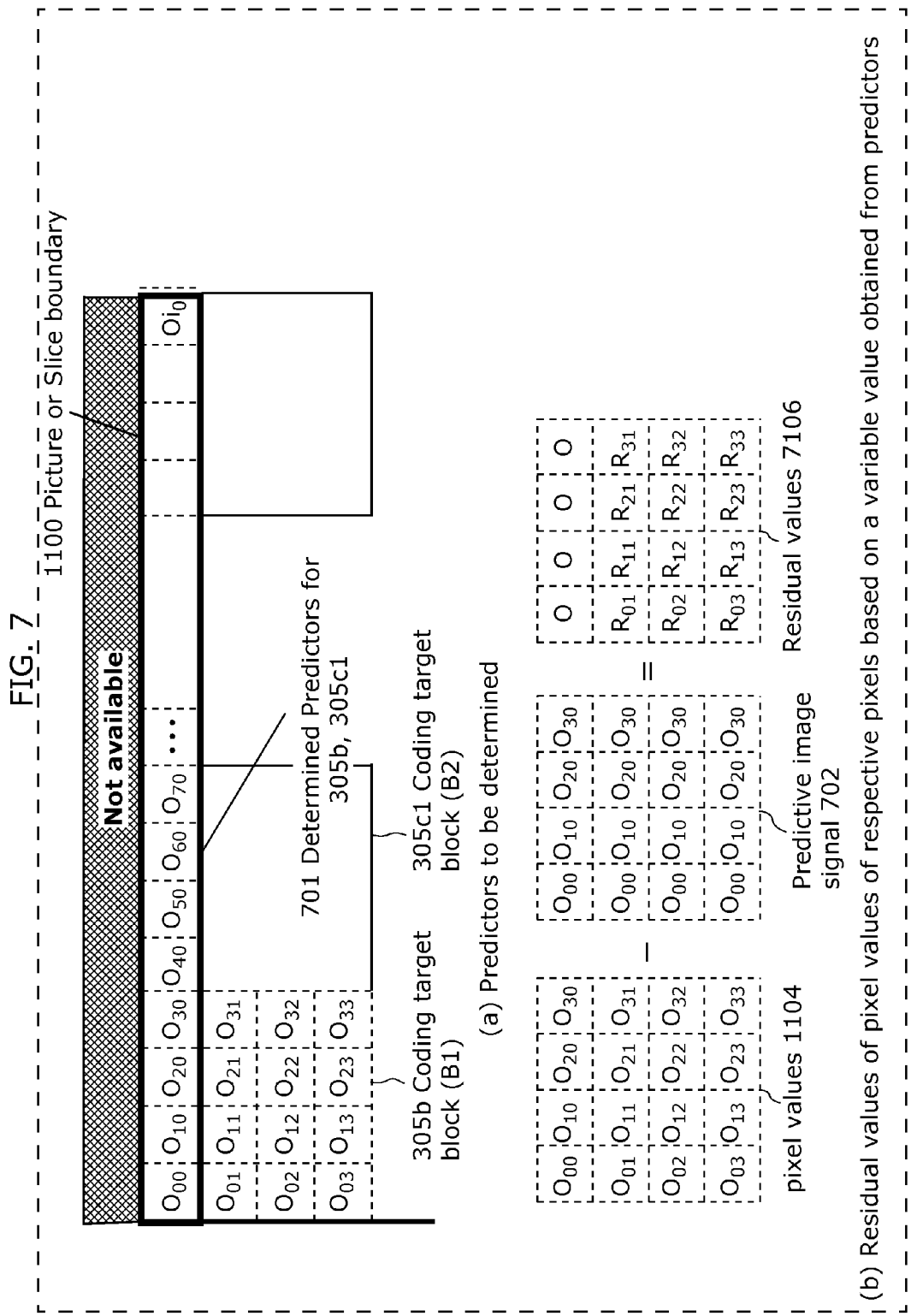
FIG. 7 shows diagrams for describing a method of determining an intra predictor according to a third example.

FIG. 7 describes a third determining example for the determining of the intra predictor in step S205 in FIG. 2.

In FIG. 7, (a) at the top of the figure shows intra predictors (denoted by reference sign 701) determined according to the third determining example. The coding control unit 101 determines part of the pixels $O_{00}$, $O_{10}$, $O_{20}$, ..., $O_{i0}$ in the first row as intra predictors for the plural coding target blocks included in the slice. It should be noted that, in this case, the block data for one row is input in advance to the coding control unit 101 (FIG. 2, S204).

When the target for coding is a coding target block (B1), the coding control unit 101 determines the pixels $O_{00}$, $O_{10}$, $O_{20}$, and $O_{30}$ as the intra predictors.

When the block targeted for coding moves to the next coding target block (B2), the coding control unit 101 determines the pixels $O_{40}$, $O_{50}$, $O_{60}$, and $O_{70}$ as the intra predictors. In this manner, for the blocks in the top one row, intra predictors are determined in the same manner as in FIG. 6 even for a block for which left side intra predictors can be obtained.

In FIG. 7, (b) at the bottom of the figure is a diagram for describing predictive image signals (denoted by reference sign 702) derived from the intra predictors ($O_{00}$, $O_{10}$, $O_{20}$, and $O_{30}$) of the coding target block (B1), and residual values (denoted by reference sign 7106).

Furthermore, when the coding target moves to the coding target block (B2) which is the next block, the difference unit 104 derives residual values of the pixels of the block, using the predictive signals derived from the values of the intra predictors ($O_{40}$, $O_{50}$, $O_{60}$, and $O_{70}$).

In this manner, according to the third determining example, in the case where intra predictors in both left and right directions cannot be completely obtained, it is possible to perform prediction coding using intra predictors in both directions, on a block such as the coding target block (B2) for which intra predictors in one of the directions are present.

It should be noted that, in the case where part (B1, B2) of top neighboring coded blocks of the coding target block are inter predicted, and the other part (B3) is intra predicted as shown in (b) in FIG. 16, the above described Examples 1, 2, and 3 for determining intra predictors may be performed by using the pixel values of the pixels of the intra predicted coded block (B3) as intra predictors, and with the pixel values of the pixels of the inter predicted coded blocks (B1, B2) being unusable as intra predictors.

In this manner, in the case where the block sizes of surrounding blocks are smaller than that of the coding target block and part of the surrounding blocks is intra predicted, using only the pixel values of the pixels of an intra predicted coded block as intra predictors allows for improvement of prediction precision.

It should be noted that, as shown in (a) in FIG. 16, in the case where part (B1, B2) of top neighboring coded blocks of the coding target block are inter predicted, the above described Examples 1, 2, and 3 for determining intra predictors may be performed assuming that all of the pixel values of the pixels of the top neighboring blocks of the coding target blocks cannot be used as intra predictors even when the other part of the top neighboring blocks (B3) is intra predicted.

(Modification 1 of Step S207)

Figure 8:
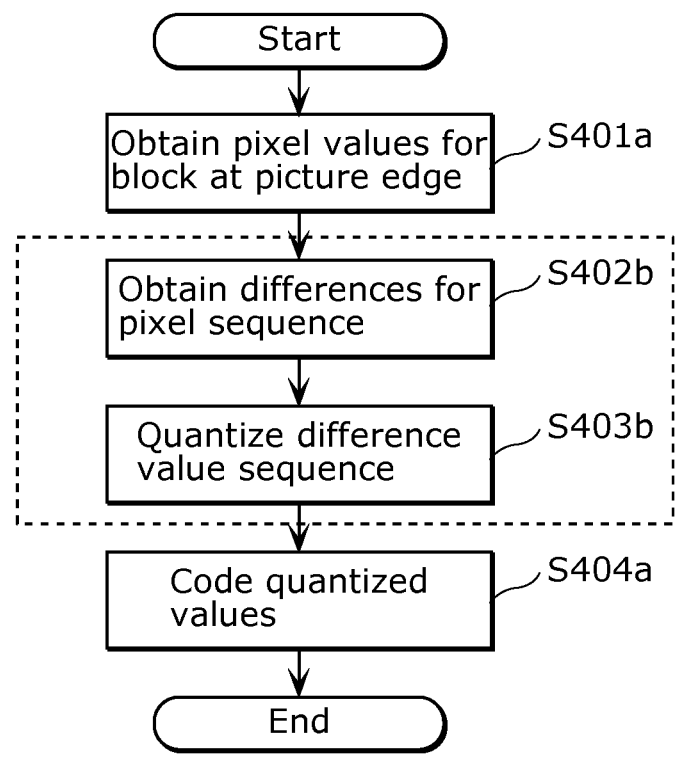
FIG. 8 is a flowchart showing modification 1 of the method of coding intra predictor-related information.

FIG. 8 is a flowchart showing a modification of the coding of the intra predictor-related information described in FIG. 4. In FIG. 8, the same reference sign is given to steps that are the same as those in FIG. 4. A one-dimensional arrangement of the intra predictors determined in step S205 is generated, difference values for the values of neighboring intra predictors are obtained (S402b), and the sequence of obtained difference values is quantized (S403b).

(Modification 2 of Step S207)

Figure 9:
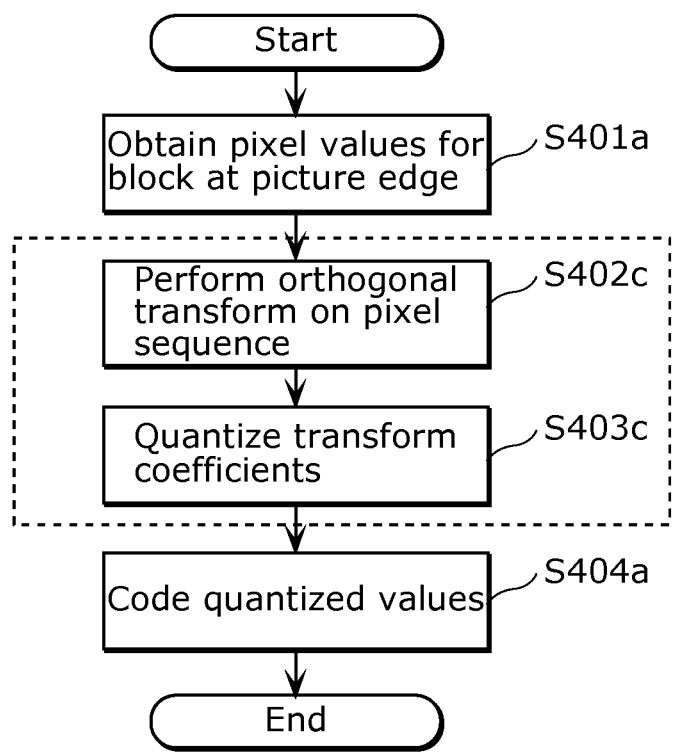
FIG. 9 is a flowchart showing modification 1 of the method of coding intra predictor-related information.

FIG. 9 is a flowchart showing a second modification of the coding of the intra predictor-related information described in FIG. 4. In FIG. 9, the same reference sign is given to steps that are the same as those in FIG. 4. Frequency-transformed values are derived for the intra predictors determined in step S205 (S402c), and values obtained by quantizing the orthogonal transformed values are output (S403c). It should be noted that orthogonal transform and quantization processing may be performed by the transform-and-quantization unit 106 instead of the intra prediction unit 103.

(Modification 3 of Step S207)

In case 3: (contents of R1) in the determining in step S205, in the case of determining a "block that refers to intra predictors of only part" of the surrounding blocks, and (determining of R2) the intra predictors were made up of pixel values of one line as in Example 3, a prediction mode for identifying which pixels to use is included in the "intra predictor-related information".

Embodiment 2

Figure 10:
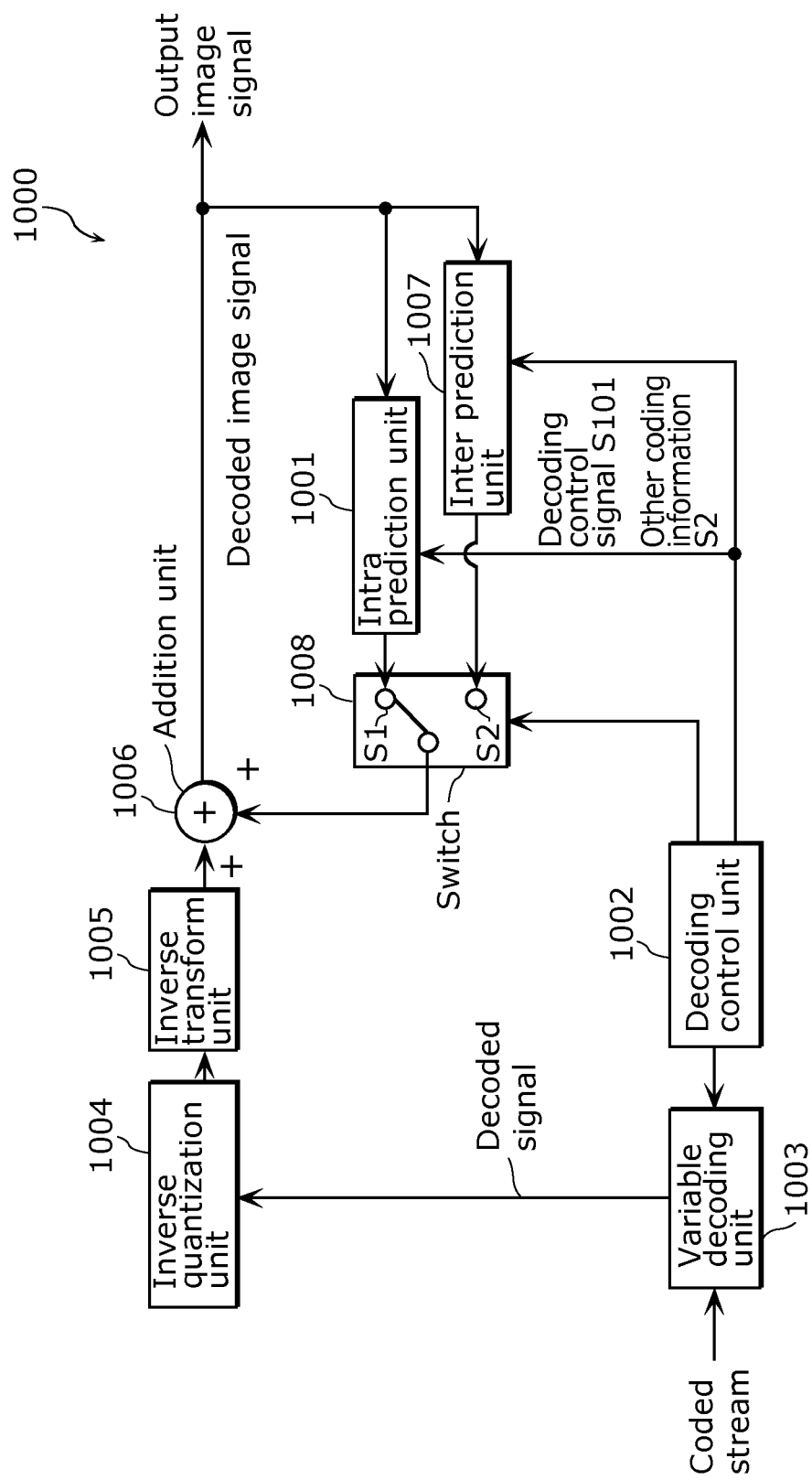
FIG. 10 is a block diagram showing a configuration of a decoding apparatus according to Embodiment 2 of the present invention.
Figure 12:
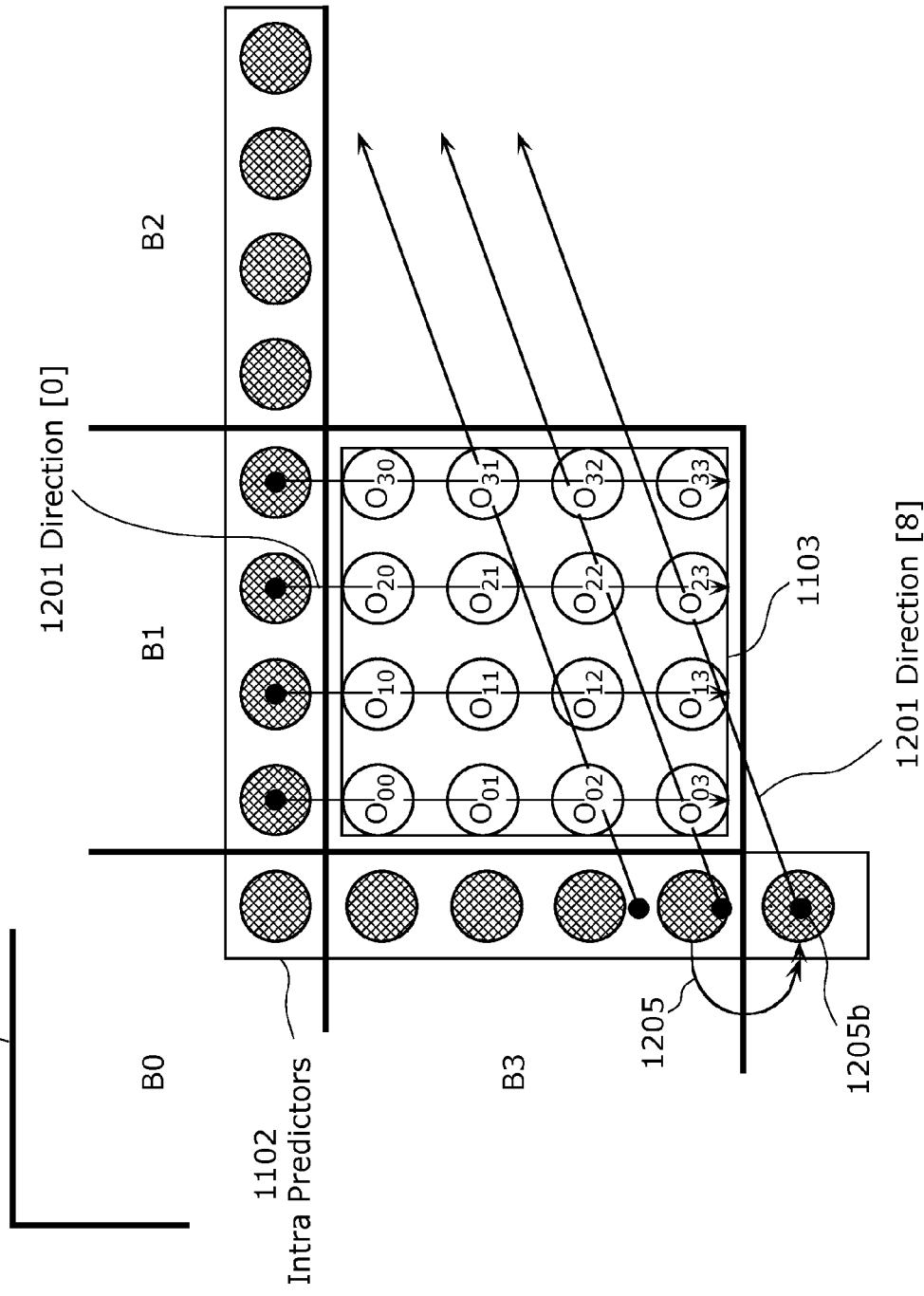
FIG. 12 is a diagram for describing intra predictors and prediction modes according to prior art.
Figure 13:
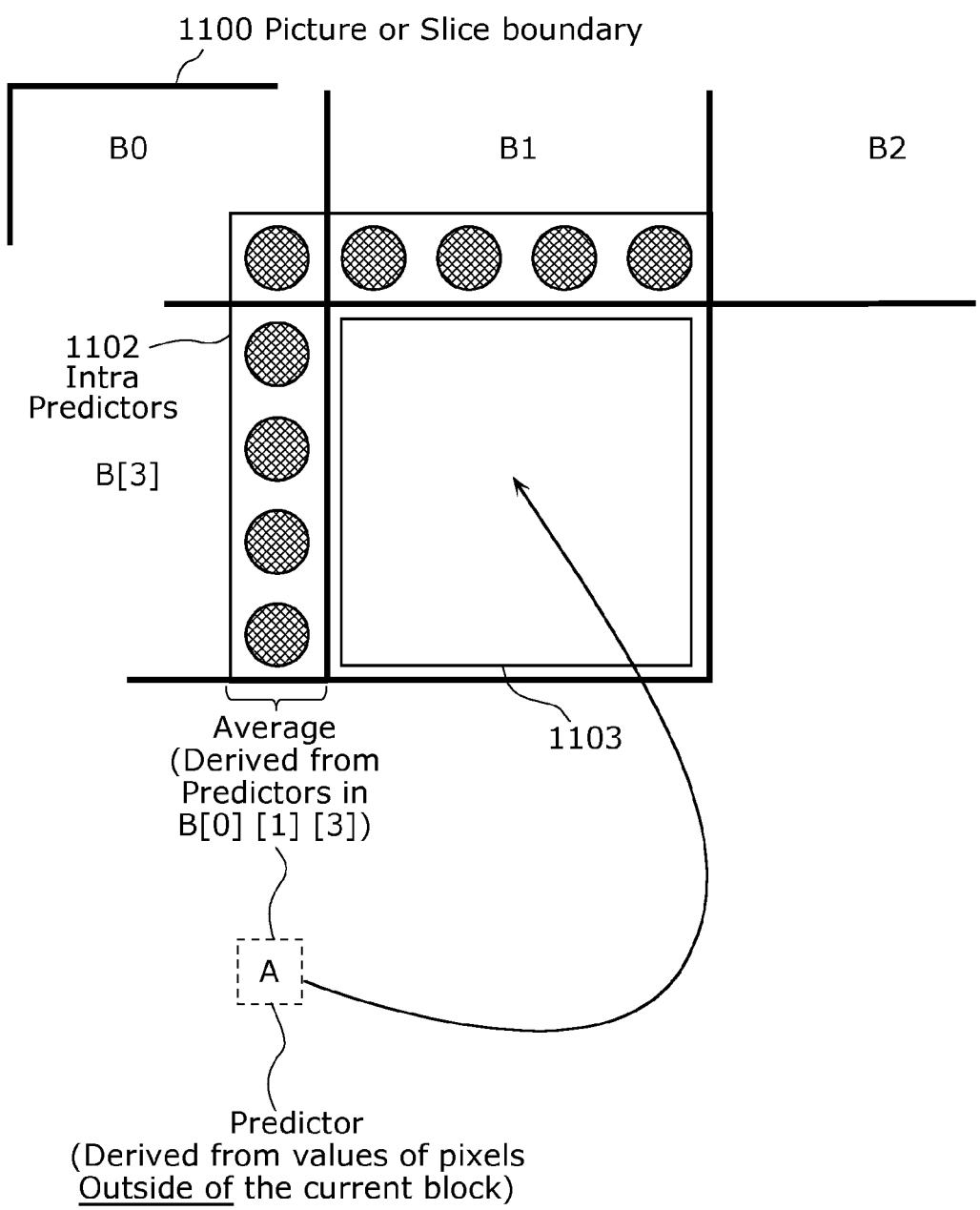
FIG. 13 is a diagram for describing DC mode prediction according to prior art.

FIG. 10 is a block diagram showing the configuration of an image decoding apparatus 1000 that decodes a coded stream coded by the image coding apparatus 100 according to the present invention.

The image decoding apparatus 1000 includes a variable-length decoding unit 1003, an inverse quantization unit 1004, an inverse transform unit 1005, an addition unit 1006, an intra prediction unit 1001, an inter prediction unit 1007, a switch 1008, and a decoding control unit 1002.

The image decoding apparatus 1000 obtains a coded stream (i-th block) of a certain block (i) that is the decoding target. The variable-length decoding unit 1003 generates quantized transform coefficients by performing variable-length decoding on the coded stream, and outputs the generated quantized transform coefficients to the inverse quantization unit 1004.

The inverse quantization unit 1004 generates orthogonal transformed coefficients by performing inverse quantization on the quantized transform coefficients obtained from the variable-length decoding unit 1003, and outputs the generated orthogonal transformed coefficients to the inverse transform unit 1005.

The inverse transform unit 1005 reconstructs a residual value for the block (i) by performing inverse orthogonal transform on the orthogonal transformed coefficients obtained from the inverse quantization unit 1004, and outputs the reconstructed residual value to the addition unit 1006.

The addition unit 1006 adds-up the residual value obtained from the inverse transform unit 1005 and the predictive image signal for the block (i) obtained from the switch 1008, and outputs a decoded image signal for the decoded target block.

Subsequently, the image decoding apparatus 1000 repeats the above-described process each time the input block is updated.

Next, the operations of the decoding control unit 1002 and the intra prediction unit 1001 of the image decoding apparatus 1000 according to the present invention shall be described.

The decoding control unit 1002 extracts the "intra predictor-related information" of the block (i) which is the current decoding target, using information extracted from the coded stream. The decoding control unit 1002 judges, based on this information, whether or not the decoding target block is a "block that does not refer to at least part of the intra predictors". When the result of the judgment indicates TRUE, the decoding control unit 1002 determines the intra predictor using the method described using FIG. 5 to FIG. 7 or extracts the coding mode depending on the case, from the intra predictor-related information of the block (i).

The intra prediction unit 1001 generates a predictive image from the extracted intra predictor.

The addition unit 1006 adds-up the predictive image and the reconstructed residual value output from the inverse transform unit 1005 to generate a reconstructed image signal for the "block having no intra predictor".

In this manner, in the decoding of a block for which part or all of the intra predictors are not present at the time of decoding, it is possible to perform image decoding using an intra predictor even during the decoding of a block for which intra predictors are not present originally.

It should be noted that, as shown in (b) in FIG. 16, the block sizes of surrounding blocks are smaller than that of the decoding target block, part (B1, B2) of the decoded blocks are inter predicted, and the other part (B3) is intra predicted. In this case, the intra predictor can be determined using the method described in FIGS. 5 to 7, by using the pixel values of pixels of decoded data decoded using intra prediction as intra predictors, and with pixel values of pixels of decoded data decoded using inter prediction being unusable as intra predictors. In this manner, by setting part of the intra predictors to the pixel values of pixels of decoded data decoded using intra prediction, prediction precision can be improved.

As described above, according to the image coding apparatus 100 and the image coding method according to Embodiment 1, the appropriate predictive image signal can be generated even at the time of coding and decoding a block that does not originally use the inter predictors in inter prediction.

Furthermore, the intra predictor-related information is output by being added to a coded stream as a second coded stream. In this manner, since the value 128 is not used as an implicit rule, the value that should be used as the intra predictor can be shared explicitly by the image coding apparatus 100 and the image decoding apparatus 1000.

In addition, according to the image decoding apparatus 1000 and the image decoding method according to Embodiment 2, it is possible to reconstruct a predictive image of a block that is the same as a certain block, by using intra predictors derived from pixels of the certain block.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 17:
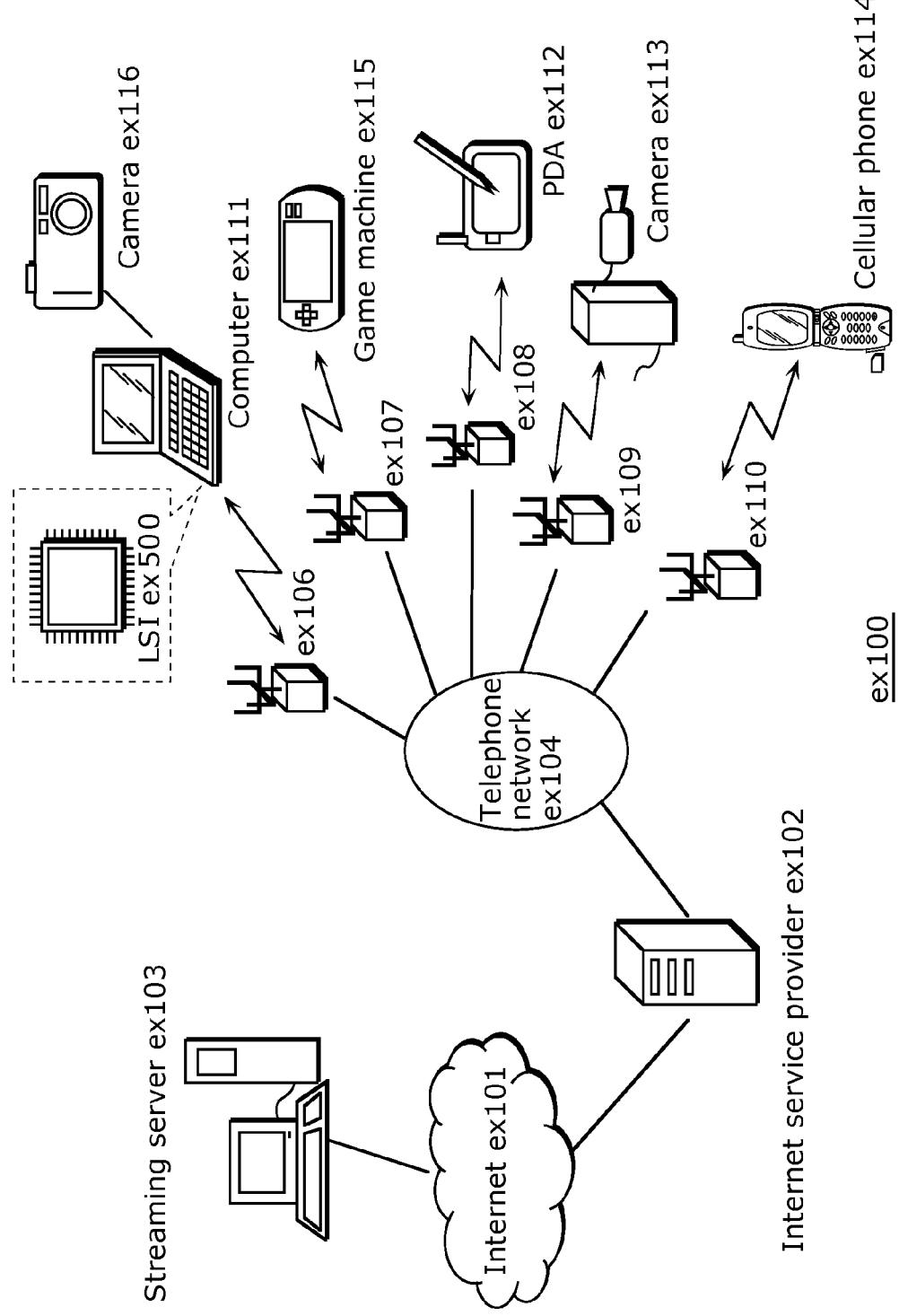
FIG. 17 is a diagram of an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
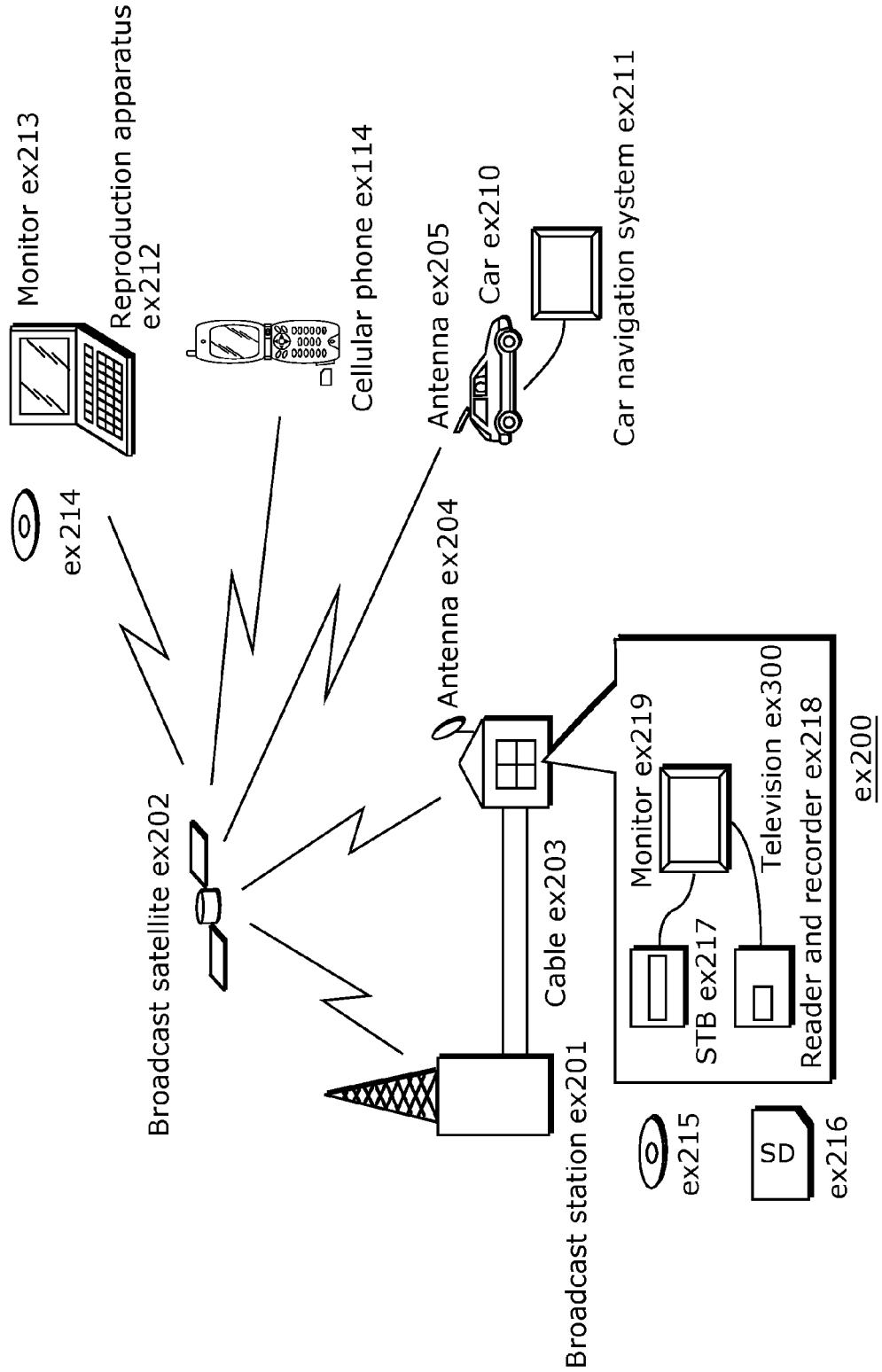
FIG. 18 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
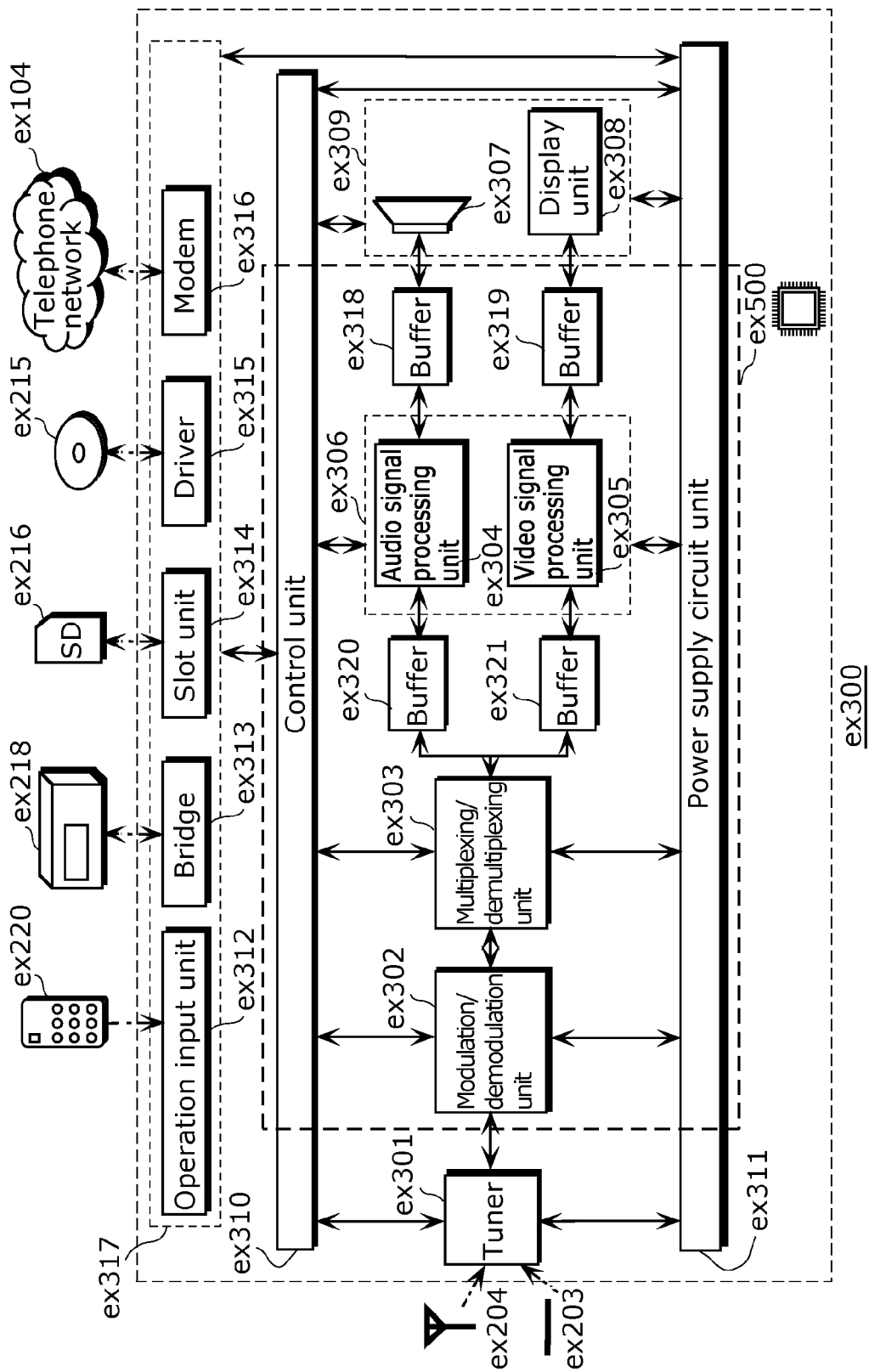
FIG. 19 is a block diagram showing an example configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other.

Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underfloor may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
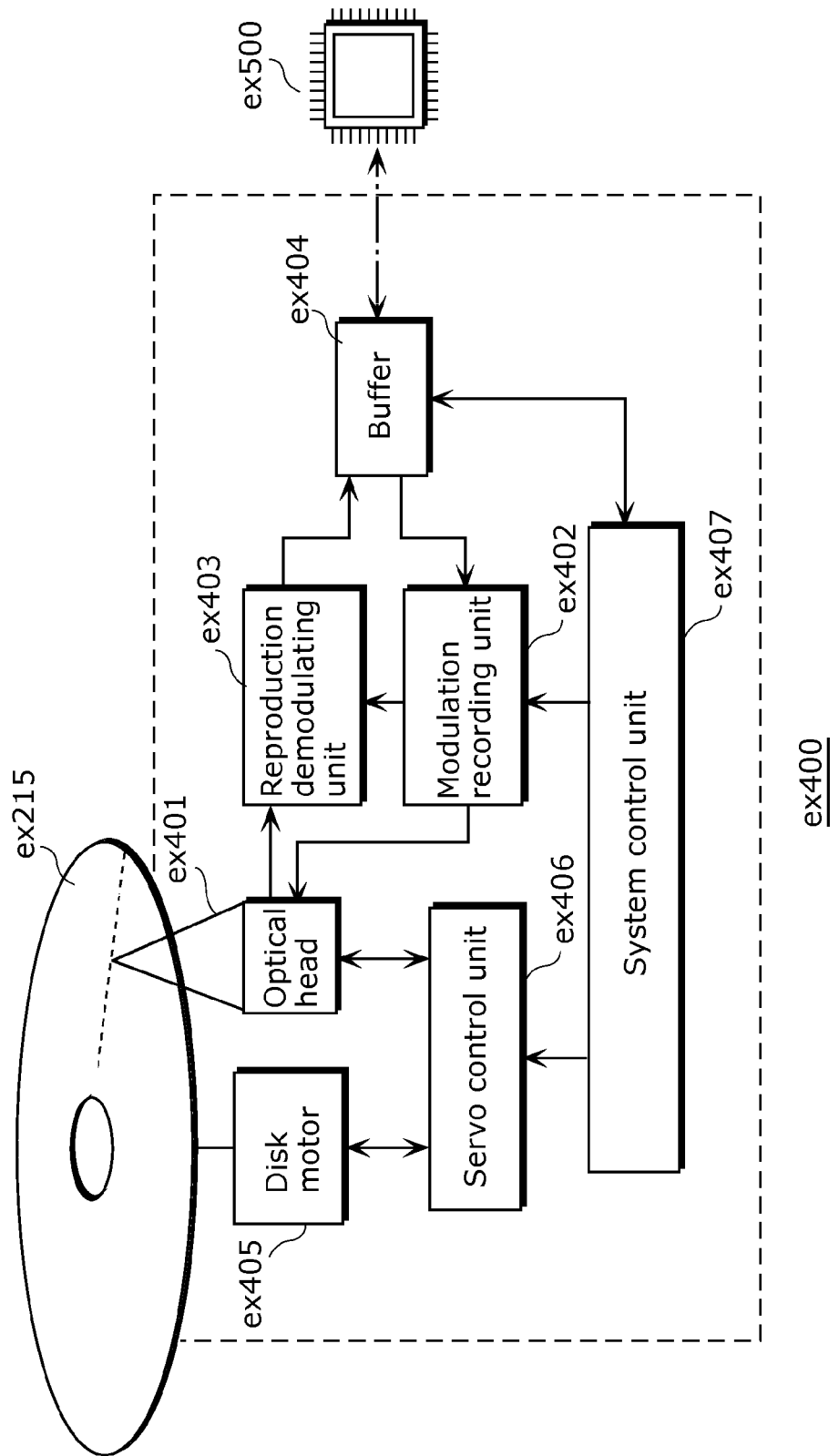
FIG. 20 is a block diagram showing an example of a configuration of an information reproducing/recording unit that reads and writes information from or on a recording medium which is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
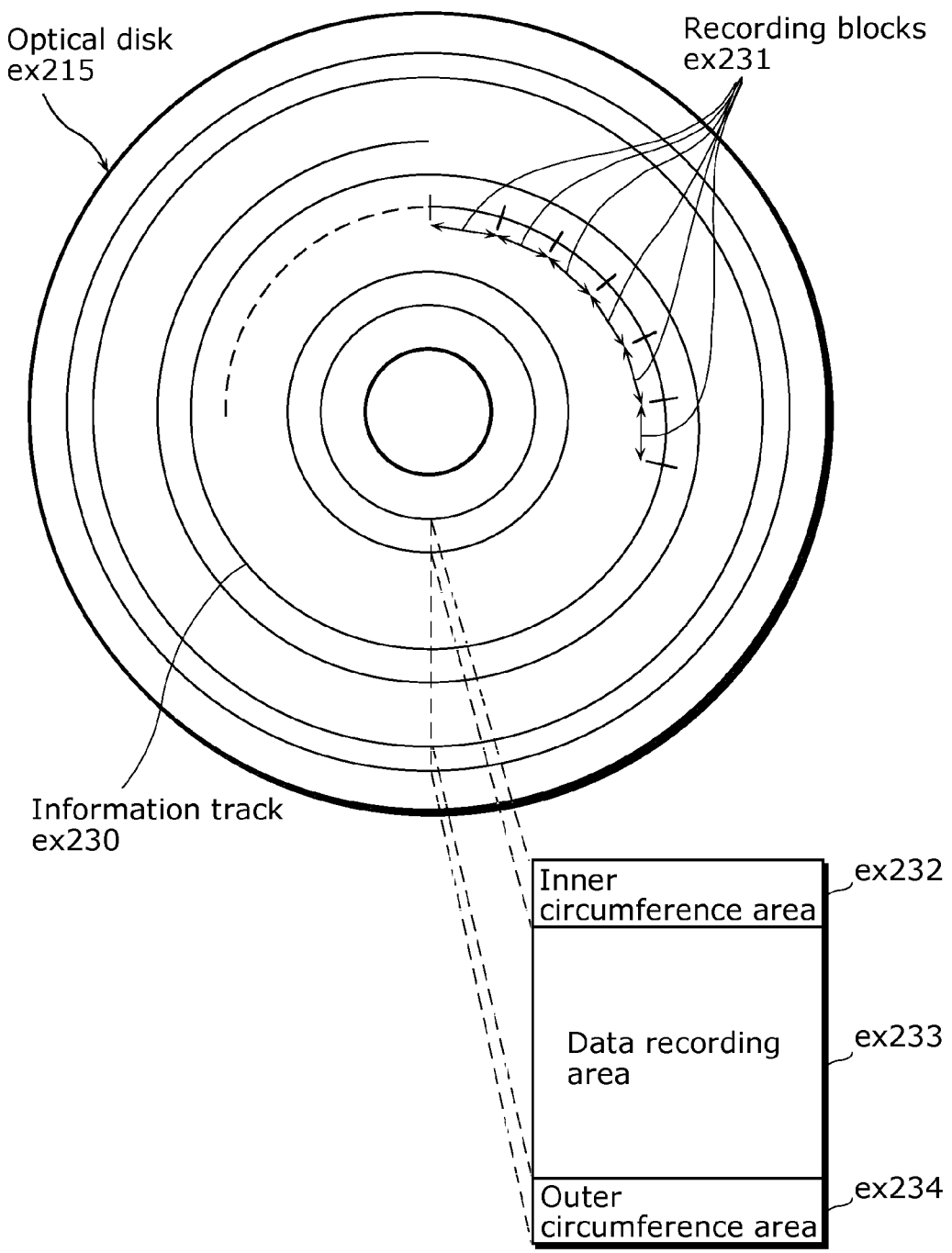
FIG. 21 is a diagram showing an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22:
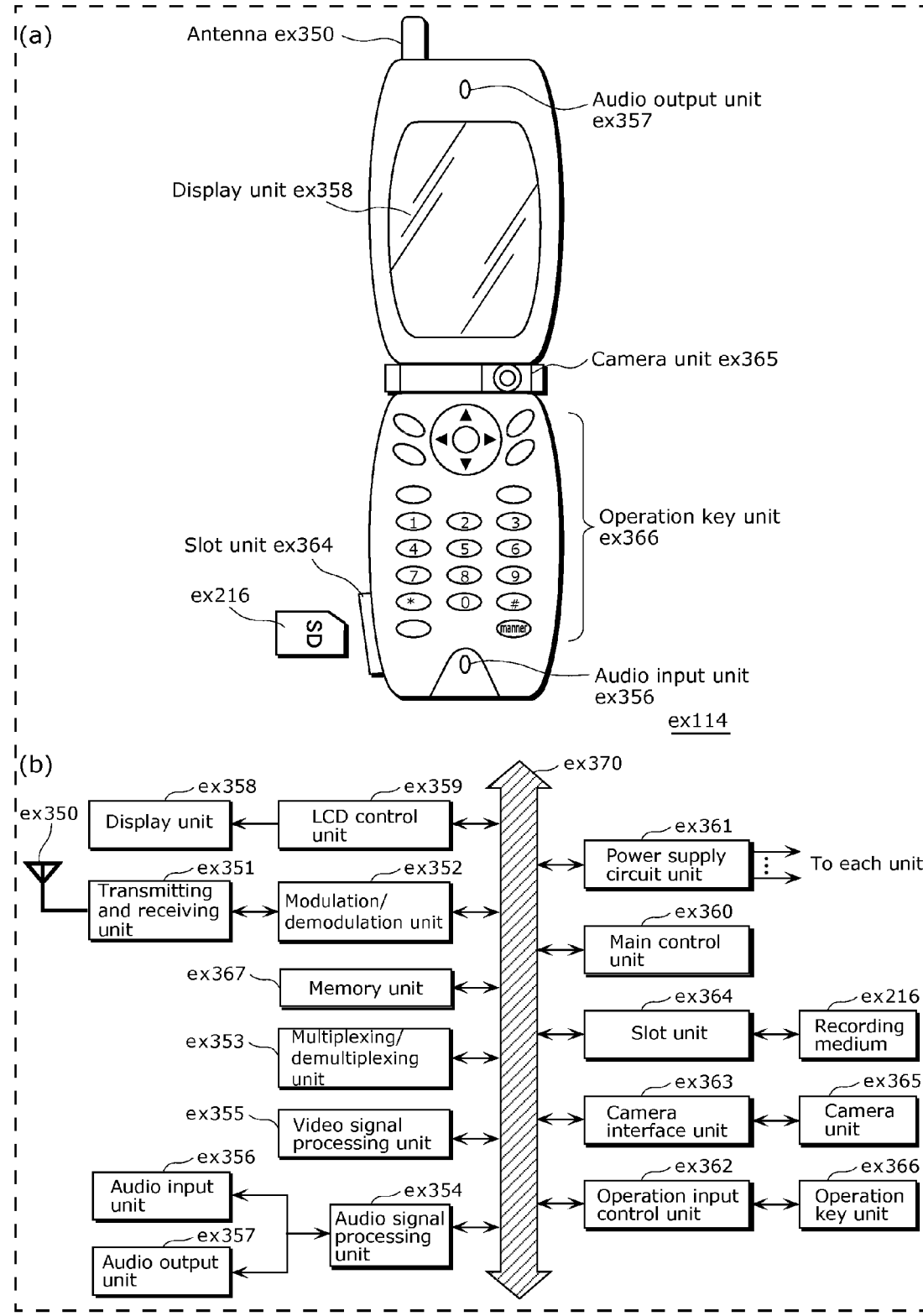
FIG. 22 shows (a) an example of a cellular phone and (b) an example of a configuration of the cellular phone.

FIG. 22 (a) illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 22 (b). In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 23:
FIG. 23 is a diagram showing a structure of multiplexed data.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
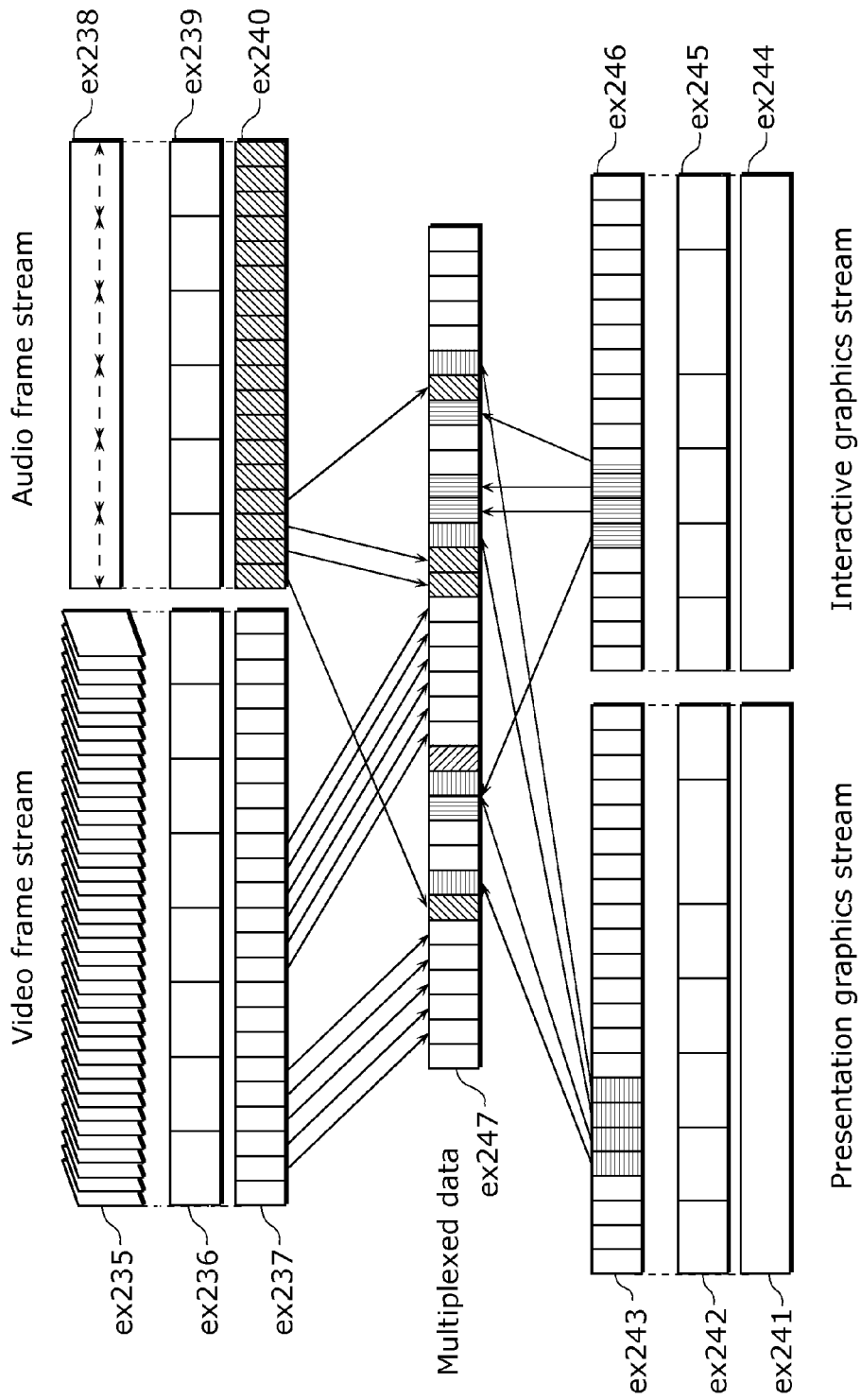
FIG. 24 is a diagram schematically illustrating how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
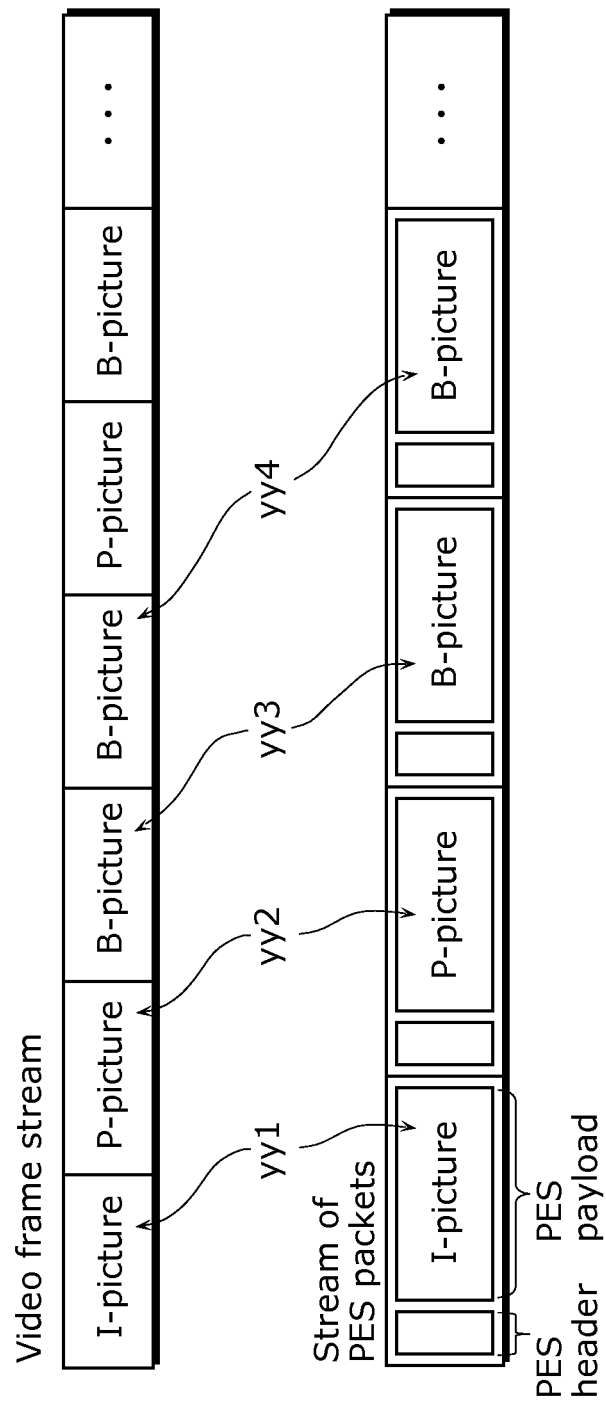
FIG. 25 is a diagram showing in more detail how a video stream is stored in a stream of PES packets.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
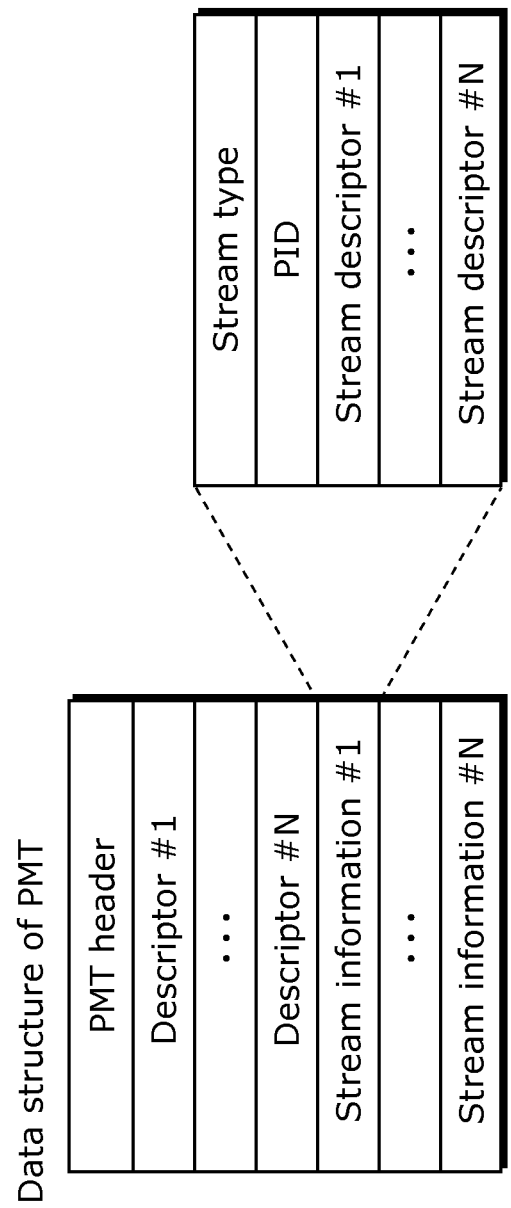
FIG. 27 is a diagram illustrating a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
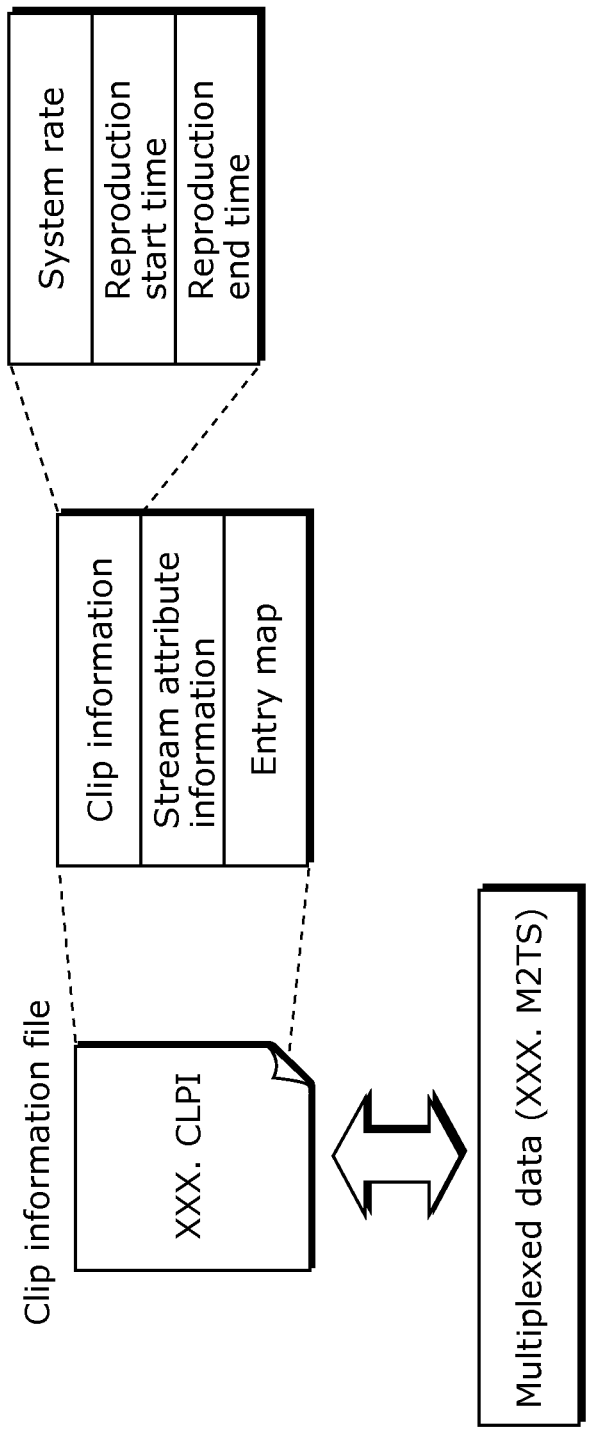
FIG. 28 is a diagram showing an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
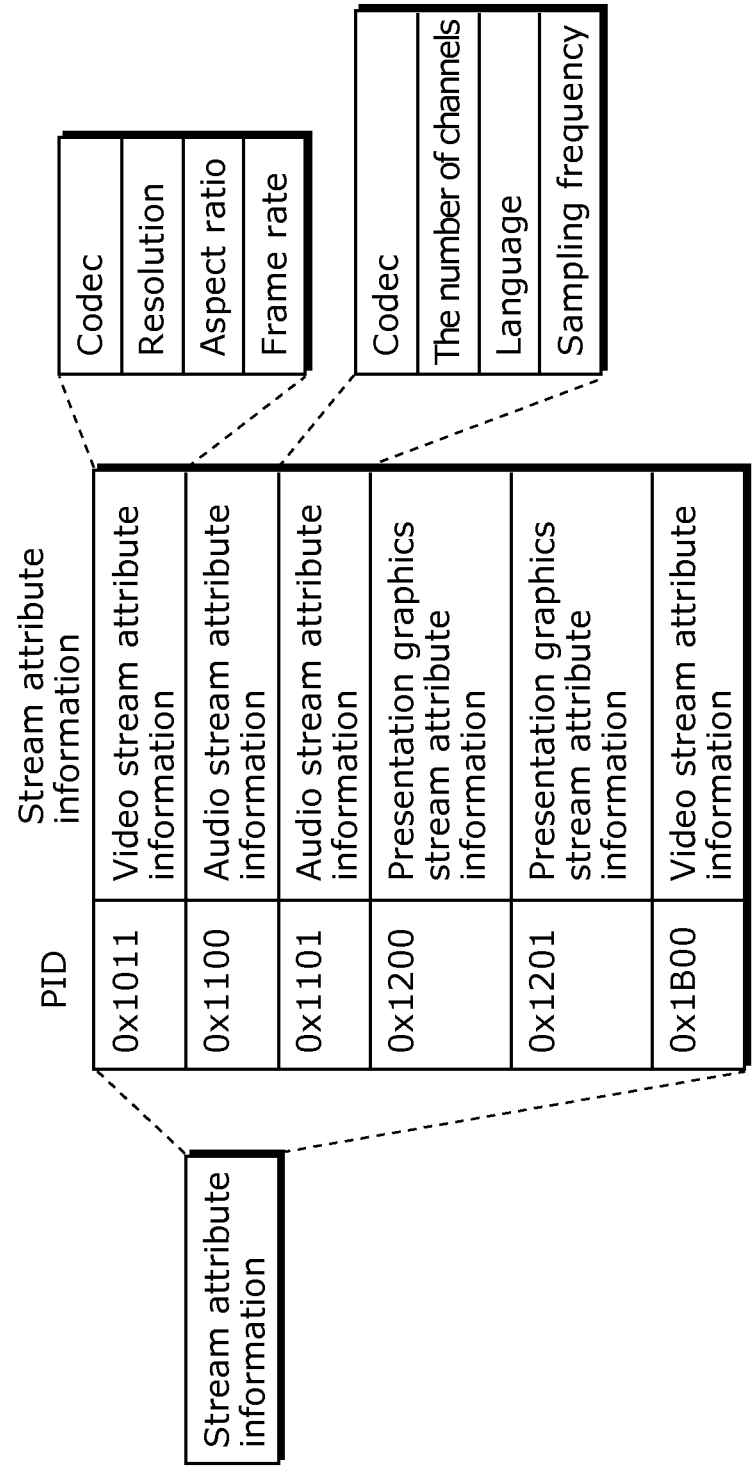
FIG. 29 is a diagram showing an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
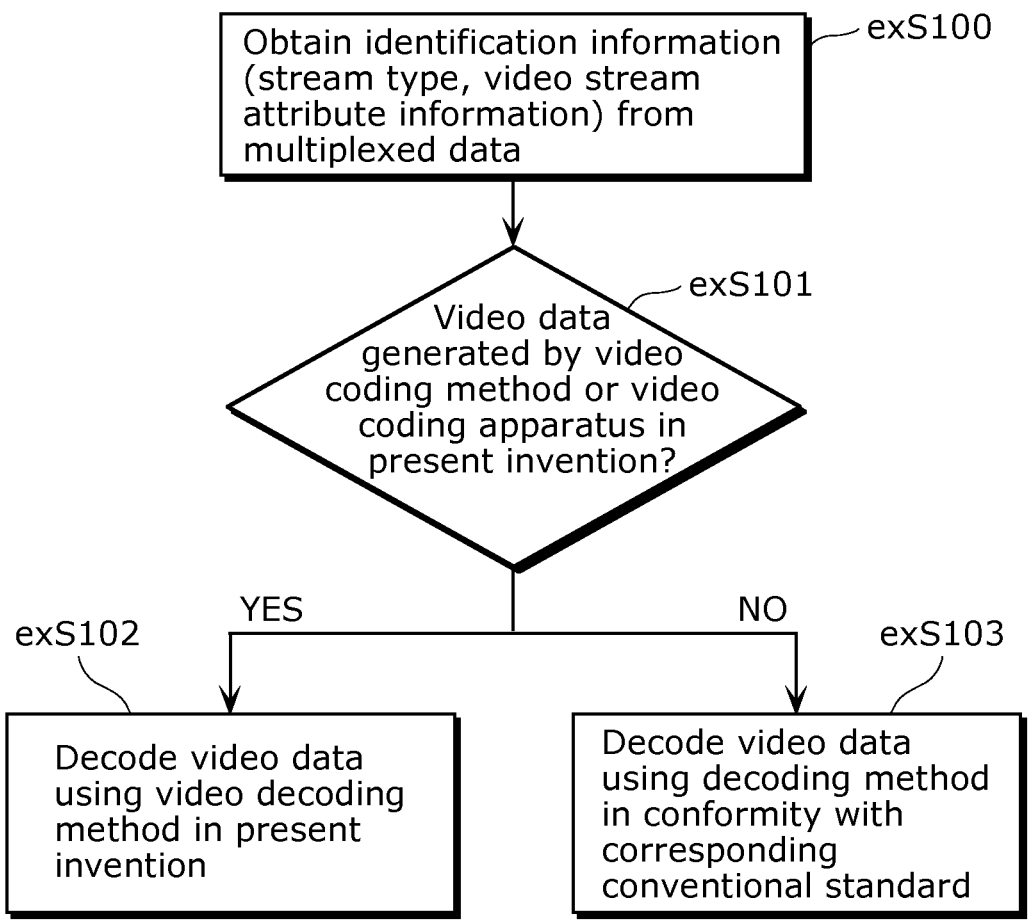
FIG. 30 is a diagram show ing steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected.

Thus, it becomes possible to decode information without any error. Furthermore, the moving picture coding method or apparatus, or the moving picture decoding method or apparatus in the present embodiment can be used in the devices and systems described above.

Embodiment 5

Figure 31:
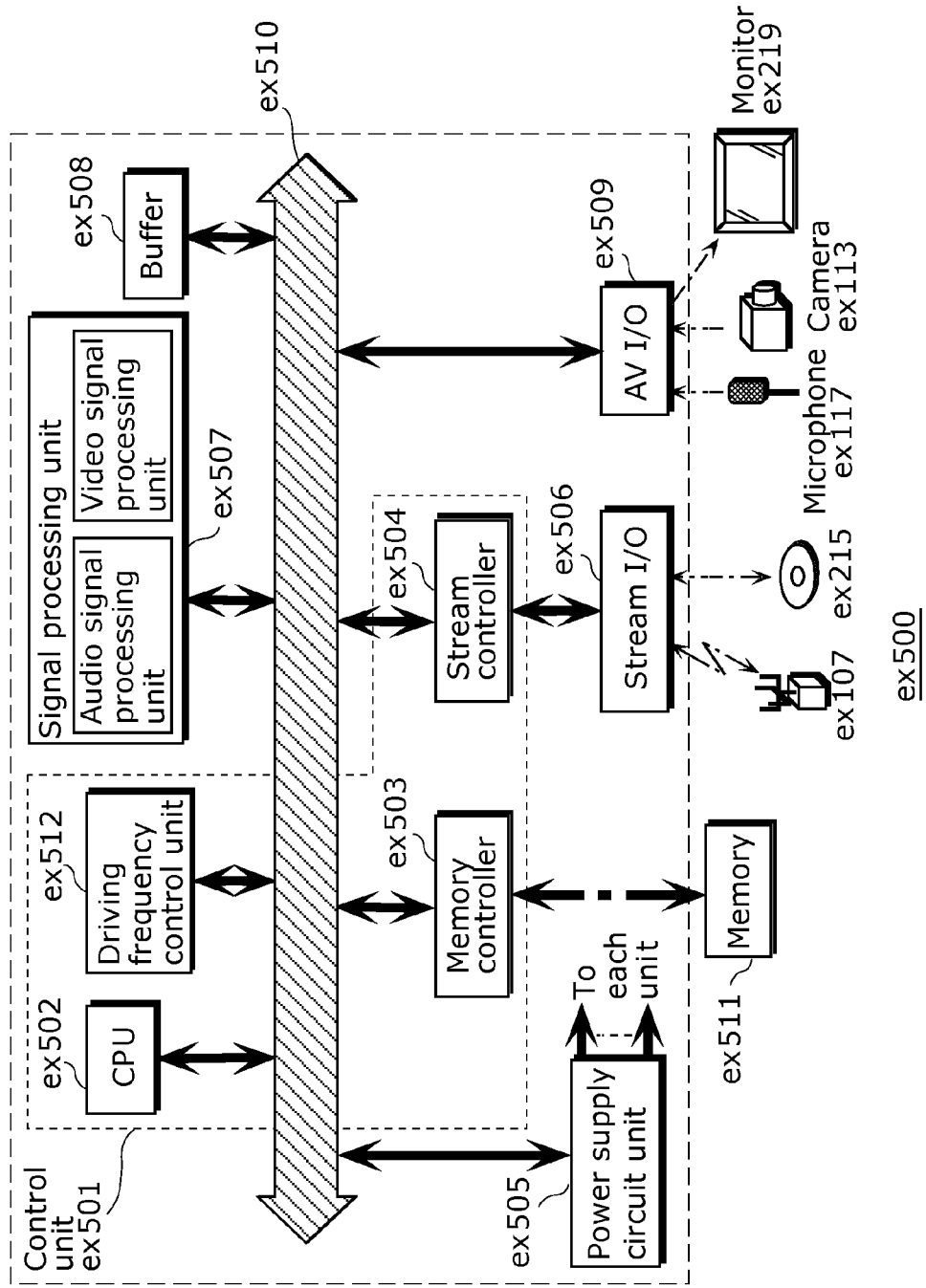
FIG. 31 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
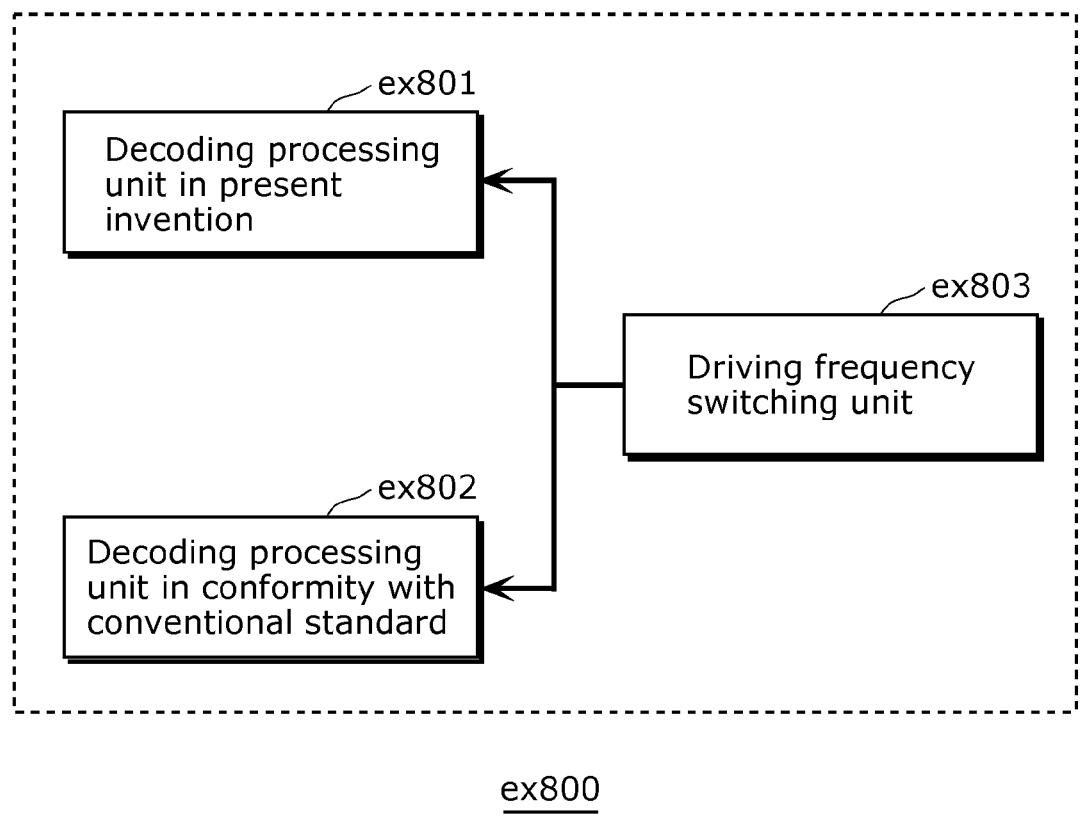
FIG. 32 is a diagram illustrating a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 4 is used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34.

The driving frequency can be selected by storing the look-up table in the buffer ex508 and in an internal memory of an LSI, and with reference to the look-up table by the CPU ex502.

Figure 33:
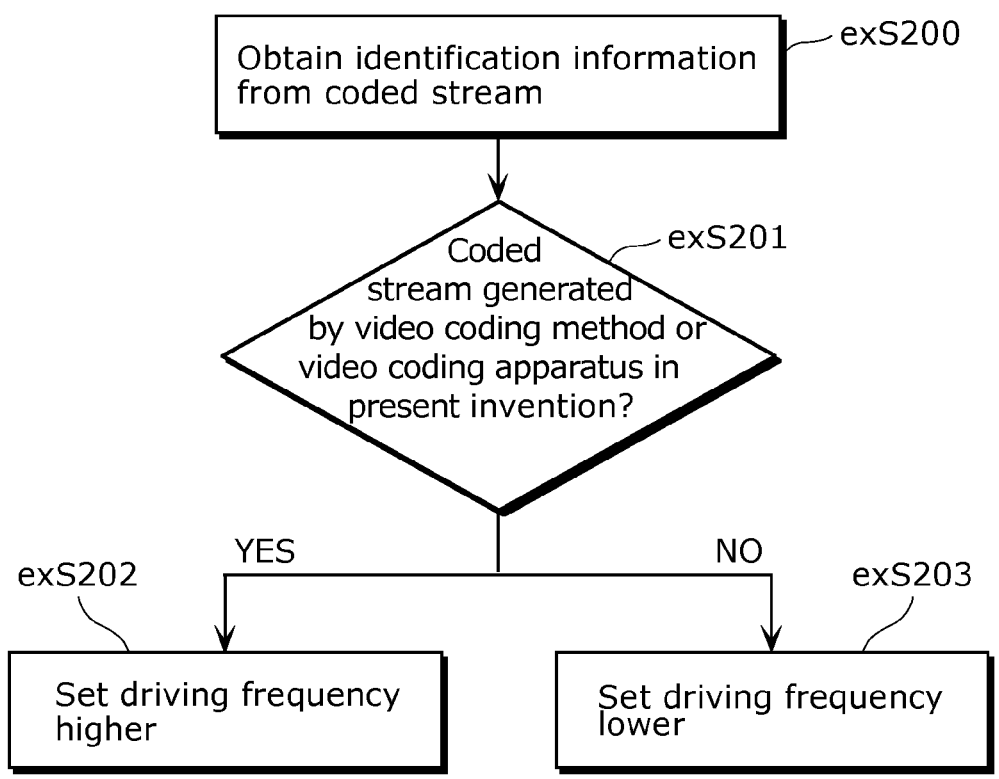
FIG. 33 is a diagram showing steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35:
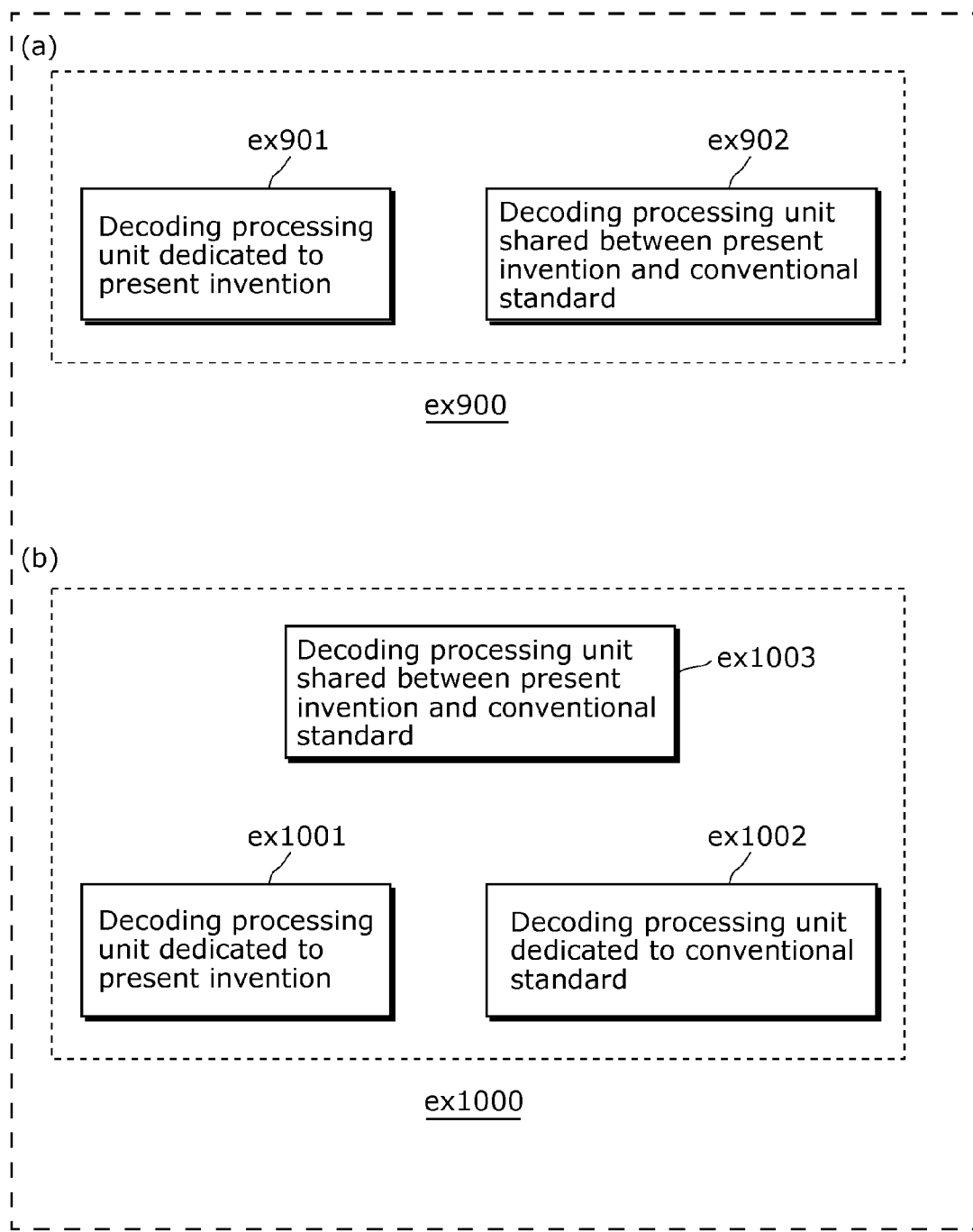
FIG. 35 shows (a) an example of a configuration for sharing a module of the signal processing unit and (b) another example of a configuration for sharing a module of the signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35 (a) shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. In particular, since the aspect of the present invention is characterized by inverse quantization, it is possible, for example, for the dedicated decoding processing unit ex901 to be used for inverse quantization, and for the decoding processing unit to be shared by any or all of the other processing, such as entropy coding, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 25 (b) shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The present invention relates to a moving picture coding method, coding apparatus, decoding method, and decoding apparatus. In particular, the present invention relates to an intra coding method and decoding method.

REFERENCE SIGNS LIST

100 Image coding apparatus
101 Coding control unit
102, 105, 1008 Switch
103, 1001 Intra prediction unit
104 Difference unit
106 Transform-and-quantization unit
107 Inverse quantization-and-inverse transform unit
108, 1006 Addition unit
109, 1007 Inter prediction unit
110 Variable-length coding unit
301, 302, 303, 304, 305, 305b, 305c1, 305c2, 1101, 1103 Block
306, 1102, 1205, 1205b Intra predictor
1000 image decoding apparatus
1002 Decoding control unit
1003 Variable-length decoding unit
1004 Inverse quantization unit
1005 Inverse transform unit
1100 Boundary line
1201 Arrow

The invention claimed is:

1. A moving picture coding method for coding, on a block basis, an image signal making up a moving picture, the moving picture coding method comprising:
(a) judging whether or not intra coding is to be performed on a coding target block;
(b) judging, when a result of the judgment in step (a) is TRUE, whether or not the coding target block is a block that does not refer to at least part of intra predictors;
(c) determining an intra predictor based on image information of the coding target block, when a result of the judgment in step (b) is TRUE; and
(d) deriving a predictive image signal for the coding target block, using the intra predictor,
wherein in step (c), when the image signal is coded on a block basis using vertical-direction prediction, intra predictors are generated by replicating pixel values of pixels included in a topmost row among pixels inside the block represented by the image signal.

2. The moving picture coding method according to claim 1, further comprising (e) coding the intra predictor determined in step (c) as intra predictor-related information for the coding target block, when the result of the judgment in step (b) is TRUE.

3. The moving picture coding method according to claim 1, wherein in step (b), the coding target block is determined to be a block that does not refer to at least part of intra predictors, when a surrounding block of the coding target block is inter predicted.

4. The moving picture coding method according to claim 1, wherein in step (b), the coding target block is determined to be a block that does not refer to at least part of intra predictors, when surrounding blocks of the coding target block have block sizes smaller than a block size of the coding target block and one of the surrounding blocks is inter predicted.

5. The moving picture coding method according to claim 1, wherein in step (c), an average value for the block represented by the image signal is determined as the intra predictor.

6. The moving picture coding method according to claim 1, wherein in step (c), the intra predictors corresponding to the number of the pixels inside the block represented by the image signal are generated by replicating, in a vertical direction, the pixel values of the pixels included in the topmost row among the pixels inside the block.

7. The moving picture coding method according to claim 1, wherein in step (c), when (i) surrounding blocks neighboring the coding target block to a top have block sizes smaller than a block size of the target coding block, (ii) one of the surrounding blocks is inter predicted, and (iii) the coding target block is to be coded using vertical-direction prediction, pixel values of pixels neighboring the inter predicted surrounding block, among pixel values of pixels represented by an image signal for the coding target block, are determined as intra predictors.

8. The moving picture coding method according to claim 7, wherein in step (c), when another one of the surrounding blocks neighboring the coding target block to the top is intra predicted, pixel values of pixels neighboring the coding target block, among pixel values of pixels of the intra predicted surrounding block, are determined as the intra predictors.

9. A moving picture coding method for coding, on a block basis, an image signal making up a moving picture, the moving picture coding method comprising:
(a) judging whether or not intra coding is to be performed on a coding target block;
(b) judging, when a result of the judgment in step (a) is TRUE, whether or not the coding target block is a block that does not refer to at least part of intra predictors;
(c) determining an intra predictor based on image information of the coding target block, when a result of the judgment in step (b) is TRUE; and
(d) deriving a predictive image signal for the coding target block, using the intra predictor,
wherein in step (c), when the image signal is coded on a block basis using horizontal-direction prediction, intra predictors are generated by replicating pixel values of pixels included in a leftmost column among pixels inside the block represented by the image signal.

10. The moving picture coding method according to claim 9, wherein in step (c), the intra predictors corresponding to the number of the pixels inside the block represented by the image signal are generated by replicating, in a horizontal direction, the pixel values of the pixels included in the leftmost column among the pixels inside the block.

11. A moving picture decoding method for decoding a coded stream, which is obtained by coding on a block basis an image signal making up a moving picture, to reconstruct the moving picture, the moving picture decoding method comprising:
(a) extracting, from the coded stream, intra predictor-related information generated from a value of a pixel of a predetermined block;
(b) determining an intra predictor for the predetermined block, based on the intra predictor-related information; and
(c) generating a predictive image signal of a decoding target block using the determined intra predictor,
wherein in step (b), when the coded stream is to be decoded on a block basis using vertical-direction prediction, intra predictors are determined by replicating pixel values of pixels included in a topmost row, among pixels in the block represented by the image signal.

12. The moving picture decoding method according to claim 11,
wherein in step (b), an average value for a block represented by the image signal is determined as the intra predictor.

13. The moving picture decoding method according to claim 11,
wherein in step (b), the intra predictors corresponding to the number of the pixels inside the block represented by the image signal are generated by replicating, in a vertical direction, the pixel values of the pixels included in the topmost row among the pixels inside the block.

14. The moving picture decoding method according to claim 11,
wherein in step (b), when (i) surrounding blocks neighboring the coding target block to a top have block sizes smaller than a block size of the target coding block, (ii) one of the surrounding blocks is inter predicted, and (iii) the coding target block is to be coded using vertical-direction prediction, pixel values of pixels neighboring the inter predicted surrounding block, among pixel values of pixels represented by an image signal for the coding target block, are determined as intra predictors.

15. The moving picture decoding method according to claim 14,
wherein in step (b), when another one of the surrounding blocks neighboring the coding target block to the top is intra predicted, pixel values of pixels neighboring the coding target block, among pixel values of pixels of the intra predicted surrounding block, are determined as the intra predictors.

16. A moving picture decoding method for decoding a coded stream, which is obtained by coding on a block basis an image signal making up a moving picture, to reconstruct the moving picture, the moving picture decoding method comprising:
(a) extracting, from the coded stream, intra predictor-related information generated from a value of a pixel of a predetermined block;
(b) determining an intra predictor for the predetermined block, based on the intra predictor-related information; and
(c) generating a predictive image signal of a decoding target block using the determined intra predictor,
wherein in step (b), when the coded stream is to be decoded on a block basis using horizontal-direction prediction, intra predictors are determined by replicating pixel values of pixels included in a leftmost column, among pixels in the block represented by the image signal.

17. The moving picture decoding method according to claim 16,
wherein in step (b), the intra predictors corresponding to the number of the pixels inside the block represented by the image signal are generated by replicating, in a horizontal direction, the pixel values of the pixels included in the leftmost column among the pixels inside the block.

* * * * *